(12) United States Patent
Joso et al.

(10) Patent No.: US 10,144,247 B2
(45) Date of Patent: Dec. 4, 2018

(54) WHEEL WITH AN INTELLIGENT SUSPENSION SYSTEM

(71) Applicants: Darien Joso, Beverly Hills, CA (US); Leigh Goldstein, Los Angeles, CA (US)

(72) Inventors: Darien Joso, Beverly Hills, CA (US); Leigh Goldstein, Los Angeles, CA (US)

(*) Notice: Subject to any disclaimer, the term of this patent is extended or adjusted under 35 U.S.C. 154(b) by 0 days.

(21) Appl. No.: 15/156,272

(22) Filed: May 16, 2016

(65) Prior Publication Data

US 2017/0349003 A1 Dec. 7, 2017

Related U.S. Application Data

(60) Provisional application No. 62/162,719, filed on May 16, 2015.

(51) Int. Cl.
| | |
|---|---|
| *B60B 9/28* | (2006.01) |
| *B60B 9/24* | (2006.01) |
| *B60B 19/00* | (2006.01) |
| *B60B 21/06* | (2006.01) |
| *B60G 13/08* | (2006.01) |
| *B60G 13/04* | (2006.01) |
| *B60B 1/14* | (2006.01) |
| *B60B 27/02* | (2006.01) |
| *B60G 13/10* | (2006.01) |
| *B60G 15/12* | (2006.01) |
| *B60B 27/00* | (2006.01) |
| *B60B 9/02* | (2006.01) |

(52) U.S. Cl.
CPC ............ *B60B 9/28* (2013.01); *B60B 1/14* (2013.01); *B60B 9/24* (2013.01); *B60B 19/00* (2013.01); *B60B 21/06* (2013.01); *B60B 27/0005* (2013.01); *B60B 27/0068* (2013.01); *B60B 27/02* (2013.01); *B60G 13/04* (2013.01); *B60G 13/08* (2013.01); *B60G 13/10* (2013.01); *B60G 15/12* (2013.01); *B60B 9/02* (2013.01); *B60B 2900/551* (2013.01); *B60G 2202/242* (2013.01); *B60G 2400/25* (2013.01); *B60G 2500/10* (2013.01); *B60G 2600/73* (2013.01)

(58) Field of Classification Search
CPC ....... B60B 9/28; B60B 27/0068; B60B 21/06; B60B 27/0005; B60B 27/02; B60B 1/14; B60B 9/24; B60B 19/00; B60B 9/02; B60B 2900/551; B60G 13/04; B60G 13/10; B60G 13/08; B60G 15/12; B60G 2500/10; B60G 2400/22; B60G 2202/242; B60G 2600/73
USPC .......................................................... 701/37
See application file for complete search history.

(56) References Cited

U.S. PATENT DOCUMENTS

| 3,672,458 A * | 6/1972 | Mackerle | B60K 7/0023 180/302 |
|---|---|---|---|
| 3,802,743 A * | 4/1974 | Hermanns | B60B 19/04 152/55 |

(Continued)

*Primary Examiner* — Tyler J Lee
(74) *Attorney, Agent, or Firm* — Milord A. Keshishian

(57) ABSTRACT

A wheel with an intelligent suspension system that includes a hub, a rim and a set of spokes with dynamically adjustable spoke lengths. Further included is one or more sensors associated with at least the hub and the rim and a microcontroller unit (MCU) that receives sensory signals from the one or more sensors, and transmits control signals to the set of spokes to dynamically control spoke lengths of the set of spokes.

22 Claims, 37 Drawing Sheets

(56) References Cited

U.S. PATENT DOCUMENTS

| | | | | |
|---|---|---|---|---|
| 4,046,339 | A * | 9/1977 | Stancliffe | B64C 25/36 244/103 R |
| 5,492,390 | A * | 2/1996 | Kugelmann, Sr. | B60B 19/00 301/5.1 |
| 7,380,618 | B2 * | 6/2008 | Gunderson | B62D 49/0635 180/7.1 |
| 7,503,567 | B2 * | 3/2009 | Frankie | A61G 5/04 180/8.2 |
| 7,806,208 | B2 * | 10/2010 | Gunderson | B62D 57/022 180/7.1 |
| 9,757,978 | B1 * | 9/2017 | Emigh | B60B 19/04 |
| 2004/0000439 | A1 * | 1/2004 | Burt | B60B 15/00 180/7.1 |
| 2006/0185911 | A1 * | 8/2006 | Gunderson | B62D 49/0635 180/8.3 |
| 2008/0288128 | A1 * | 11/2008 | Gunderson | B62D 49/0635 701/1 |
| 2010/0201098 | A1 * | 8/2010 | Fitzsimons | B60B 1/14 280/287 |
| 2017/0151830 | A1 * | 6/2017 | Weber | B60B 19/00 |
| 2017/0197675 | A1 * | 7/2017 | Alidan | B62D 55/06 |

* cited by examiner

Figure 5. Coordinate System for Wheel Measurements

```
┌─────────────────────────────────────────────────────────────────────────┐
│ The coordinate system is given in Fig. 5. Inputs are parameters         │
│ ($\Delta h_x$, $\Delta h_y$), the desired relative offset of the hub    │
│ from the rim's center in the x and y directions. $\Delta t$ is set to   │
│ the shortest time allowed between commands in the specifications for    │
│ the spokes.                                                             │
└─────────────────────────────────────────────────────────────────────────┘
                                    ↓
┌─────────────────────────────────────────────────────────────────────────┐
│ Save the current time as $t_0$. Input data from the rim sensor and the  │
│ hub sensor. Process the sensor data to get $\theta$, $\theta'$,         │
│ $\theta''$, $c_x, c_x', c_x''$, $c_y, c_y', c_y''$ for the rim and y,   │
│ $h_x, h_y$ for the hub. Values not reported by the sensors are computed │
│ from the sensor data using numerical differentiation or integration.    │
└─────────────────────────────────────────────────────────────────────────┘
                                    ↓
┌─────────────────────────────────────────────────────────────────────────┐
│ Approximately predict updated values for time $t = t_0 + \Delta t$      │
│ assuming constant acceleration:                                          │
│ $\theta \leftarrow \theta + \theta' \Delta t + \tfrac{1}{2}\theta'' \Delta t^2$ │
│ $c_x \leftarrow c_x + c_x' \Delta t + \tfrac{1}{2} c_x'' \Delta t^2$    │
│ $c_y \leftarrow c_y + c_y' \Delta t + \tfrac{1}{2} c_y'' \Delta t^2$    │
│ $\theta' \leftarrow \theta' + \theta'' \Delta t$                         │
│ $c_x' \leftarrow c_x' + c_x'' \Delta t$                                  │
│ $c_y' \leftarrow c_y' + c_y'' \Delta t$                                  │
└─────────────────────────────────────────────────────────────────────────┘
                                    ↓
┌─────────────────────────────────────────────────────────────────────────┐
│ Compute the needed S1, S2 and S3 to get the requested hub displacement: │
│   Let $\alpha = 0$ for pneumatic, hydraulic, staged electric spoke      │
│   hubs, and radial linear motor hubs.                                    │
│   Let $\alpha = 90$ for tangential linear motor hubs.                    │
│   A1 = ( R cos($\theta$), R sin($\theta$) )                              │
│   A2 = ( R cos($\theta$+120), R sin($\theta$+120) )                      │
│   A3 = ( R cos($\theta$+240), R sin($\theta$+240) )                      │
│   B1 = ( r cos($\alpha+\theta$), r sin($\alpha+\theta$) ) + ($\Delta h_x + c_x$, $\Delta h_y + c_y$ ) │
│   B2 = ( r cos($\alpha+\theta$+120), r sin($\alpha+\theta$+120) ) + ($\Delta h_x + c_x$, $\Delta h_y + c_y$ ) │
│   B3 = ( r cos($\alpha+\theta$+240), r sin($\alpha+\theta$+240) ) + ($\Delta h_x + c_x$, $\Delta h_y + c_y$ ) │
│   S1 = $\|$ A1 - B1 $\|$                                                 │
│   S2 = $\|$ A2 - B2 $\|$                                                 │
│   S3 = $\|$ A3 - B3 $\|$                                                 │
│   Check that S1, S2, and S3 are all within the range of possible values │
│ (determined by the maximum and minimum attainable lengths of the spokes).│
└─────────────────────────────────────────────────────────────────────────┘
                                    ↓
┌─────────────────────────────────────────────────────────────────────────┐
│ If the spokes accept velocity control send instructions to them to      │
│ adjust to lengths S1, S2 and S3 respectively by the time $t_0 + \Delta t$.│
│                                                                          │
│ If the spokes do not accept velocity control estimate the time $\delta t$│
│ required for each spoke to reach the desired length (from the change in │
│ spoke length and the spoke specifications) and send out the instruction │
│ for that spoke at time $t_0 + \Delta t - \delta t$.                      │
└─────────────────────────────────────────────────────────────────────────┘
                                    ↓
┌─────────────────────────────────────────────────────────────────────────┐
│ At time $t_0 + \Delta t$ return to the second step.                      │
└─────────────────────────────────────────────────────────────────────────┘
```

FIG. 6A

The coordinate system is given in Fig. 5. Inputs are parameters ($\Delta h_x$, $\Delta h_y$), the desired relative offset of the hub from the rim's center in the x and y directions. $\Delta t$ is set to the shortest time allowed between commands in the specifications for the spokes.

↓

Save the current time as $t_0$. Input data from the rim sensor and the hub sensor. Process the sensor data to get $\theta$, $\theta'$, $\theta''$, $c_x$, $c_x'$, $c_x''$, $c_y$, $c_y'$, $c_y''$ for the rim and $\gamma$, $\gamma'$, $\gamma''$, $h_x$, $h_y$ for the hub. Values not reported by the sensors are computed from the sensor data using numerical differentiation or integration.

↓

Approximately predict updated values for time $t = t_0 + \Delta t$ assuming constant acceleration:
$\theta \leftarrow \theta + \theta' \Delta t + \tfrac{1}{2} \theta'' \Delta t^2$
$c_x \leftarrow c_x + c_x' \Delta t + \tfrac{1}{2} c_x'' \Delta t^2$
$c_y \leftarrow c_y + c_y' \Delta t + \tfrac{1}{2} c_y'' \Delta t^2$
$\theta' \leftarrow \theta' + \theta'' \Delta t$
$c_x' \leftarrow c_x' + c_x'' \Delta t$
$c_y' \leftarrow c_y' + c_y'' \Delta t$
$\gamma \leftarrow \gamma + \gamma' \Delta t + \tfrac{1}{2} \gamma'' \Delta t^2$

↓

Compute the needed $S_1$, $S_2$ and $S_3$ to get the requested hub displacement::
$A_1 = (R \cos(\theta), R \sin(\theta))$
$A_2 = (R \cos(\theta + 120), R \sin(\theta + 120))$
$A_3 = (R \cos(\theta + 240), R \sin(\theta + 240))$
$B_1 = (r \cos(\gamma), r \sin(\gamma)) + (\Delta h_x + c_x, \Delta h_y + c_y)$
$B_2 = (r \cos(\gamma + 120), r \sin(\gamma + 120)) + (\Delta h_x + c_x, \Delta h_y + c_y)$
$B_3 = (r \cos(\gamma + 240), r \sin(\gamma + 240)) + (\Delta h_x + c_x, \Delta h_y + c_y)$
$S_1 = \| A_1 - B_1 \|$
$S_2 = \| A_2 - B_2 \|$
$S_3 = \| A_3 - B_3 \|$
Check that $S_1$, $S_2$, and $S_3$ are all within the range of possible values (determined by the maximum and minimum attainable lengths of the spokes).

↓

If the spokes accept velocity control send instructions to them to adjust to lengths $S_1$, $S_2$ and $S_3$ respectively by the time $t_0 + \Delta t$.

If the spokes do not accept velocity control estimate the time $\delta t$ required for each spoke to reach the desired length (from the change in spoke length and the spoke specifications) and send out the instruction for that spoke at time $t_0 + \Delta t - \delta t$.

↓

At time $t_0 + \Delta t$ return to the second step.

FIG. 6B

The coordinate system is given in Fig. 5. Inputs are parameters ($\Delta h_x$, $\Delta h_y$), the desired relative offset of the hub from the rim's center in the x and y directions. $\Delta t$ is set to the shortest time allowed between commands in the specifications for the spokes.

Save the current time as $t_0$. Input data from the rim sensor and the hub sensor. Process the sensor data to get $\theta, \theta', \theta'', c_x, c_x', c_x'', c_y, c_y', c_y''$ for the rim and $\gamma, \gamma', \gamma'', h_x, h_y$ for the hub. Values not reported by the sensors are computed from the sensor data using numerical differentiation or integration.

Compute the current measured values of the spoke lengths (if the spokes also report their lengths those values can be averaged in to reduce error):
  $A1 = (R\cos(\theta), R\sin(\theta))$
  $A2 = (R\cos(\theta + 120), R\sin(\theta + 120))$
  $A3 = (R\cos(\theta + 240), R\sin(\theta + 240))$
  $B1 = (r\cos(\gamma), r\sin(\gamma)) + (h_x, h_y)$
  $B2 = (r\cos(\gamma + 120), r\sin(\gamma + 120)) + (h_x, h_y)$
  $B3 = (r\cos(\gamma + 240), r\sin(\gamma + 240)) + (h_x, h_y)$
  $S1_0 = \|A1 - B1\|$
  $S2_0 = \|A2 - B2\|$
  $S3_0 = \|A3 - B3\|$
  $\gamma_0 = \gamma$ Approximately predict updated values for time $t = t_0 + \Delta t$ assuming constant acceleration:
  $\theta \leftarrow \theta + \theta'\Delta t + \tfrac{1}{2}\theta''\Delta t^2$
  $c_x \leftarrow c_x + c_x'\Delta t + \tfrac{1}{2}c_x''\Delta t^2$
  $c_y \leftarrow c_y + c_y'\Delta t + \tfrac{1}{2}c_y''\Delta t^2$
  $\theta' \leftarrow \theta' + \theta''\Delta t$
  $c_x' \leftarrow c_x' + c_x''\Delta t$
  $c_y' \leftarrow c_y' + c_y''\Delta t$

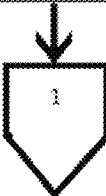

FIG. 6C-1

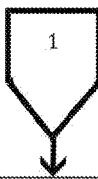

DETERMINE MINIMAL SPOKE LENGTH CHANGES BASED ON OPTIMAL Y
(e.g, using constrained non-linear "minimax solution" module that may be solved using common class of iterative solutions such as using a very well known iterative quasi-Newton method)

$A2 = (R\cos(\theta + 120), R\sin(\theta + 120))$
$A3 = (R\cos(\theta + 240), R\sin(\theta + 240))$
$B1 = (r\cos(\gamma), r\sin(\gamma)) + (\Delta h_x + c_x, \Delta h_y + c_y)$
$B2 = (r\cos(\gamma + 120), r\sin(\gamma + 120)) + (\Delta h_x + c_x, \Delta h_y + c_y)$
$B3 = (r\cos(\gamma + 240), r\sin(\gamma + 240)) + (\Delta h_x + c_x, \Delta h_y + c_y)$
$S1 = \| A1 - B1 \|$
$S2 = \| A2 - B2 \|$
$S3 = \| A3 - B3 \|$
$\gamma < \gamma_{max}$ and $\gamma > \gamma_{min}$ (where $\gamma_{max}$ and $\gamma_{min}$ are the maximum and minimum values of $\gamma$ allowed by the wheel geometry). S1, S2, and S3 are all within the range of possible values (determined by the maximum and minimum attainable lengths of the spokes). One of the many ways to solve this common class of problems is an iterative quasi-Newton method. The initial value for $\gamma$ is $\gamma_0$. By varying $\gamma$ this method can increase the speed of adjusting the hub's relative position.

If the spokes accept velocity control send instructions to them to adjust to lengths S1, S2 and S3 respectively by the time $t_0 + \Delta t$.

If the spokes do not accept velocity control estimate the time $\delta t$ required for each spoke to reach the desired length (from the change in spoke length and the spoke specifications) and send out the instruction for that spoke at time $t_0 + \Delta t - \delta t$.

At time $t_0 + \Delta t$ return to the second step.

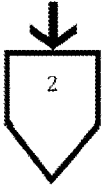

FIG. 6C-2

The coordinate system is given in Fig. 5. Inputs are parameters ($\Delta h_x$, $h_{yo}$). $\Delta h_x$ is the desired relative offset of the hub from the rim's center in the x coordinate, and $h_{yo}$ is the desired absolute height above the ground for y. $\Delta t$ is set to the shortest time allowed between commands to the spokes.

↓

Save the current time as $t_o$. Input data from the rim sensor and the hub sensor. Process the sensor data to get $\theta$, $\theta'$, $\theta''$, $c_x$, $c_x'$, $c_x''$, $c_y$, $c_y'$, $c_y''$ for the rim and y, $h_y$, $h_y'$ for the hub. Values not reported by the sensors are computed from the sensor data using numerical differentiation or integration.

↓

Approximately predict updated values for time $t = t_o + \Delta t$ assuming constant acceleration:
$\theta \leftarrow \theta + \theta' \Delta t + \frac{1}{2} \theta'' \Delta t^2$
$c_x \leftarrow c_x + c_x' \Delta t + \frac{1}{2} c_x'' \Delta t^2$
$c_y \leftarrow c_y + c_y' \Delta t + \frac{1}{2} c_y'' \Delta t^2$
$\theta' \leftarrow \theta' + \theta'' \Delta t$
$c_x' \leftarrow c_x' + c_x'' \Delta t$
$c_y' \leftarrow c_y' + c_y'' \Delta t$

↓

Compute the needed S1, S2 and S3 to get the requested hub displacement:
Let $\alpha = 0$ for pneumatic, hydraulic, staged electric spoke hubs, and radial linear motor hubs.
Let $\alpha = 90$ for tangential linear motor hubs.
$A1 = (R \cos(\theta), R \sin(\theta))$
$A2 = (R \cos(\theta + 120), R \sin(\theta + 120))$
$A3 = (R \cos(\theta + 240), R \sin(\theta + 240))$
$B1 = (r \cos(\alpha + \theta), r \sin(\alpha + \theta)) + (\Delta h_x + c_x, h_{yo})$
$B2 = (r \cos(\alpha + \theta + 120), r \sin(\alpha + \theta + 120)) + (\Delta h_x + c_x, h_{yo})$
$B3 = (r \cos(\alpha + \theta + 240), r \sin(\alpha + \theta + 240)) + (\Delta h_x + c_x, h_{yo})$
$S1 = \| A1 - B1 \|$
$S2 = \| A2 - B2 \|$
$S3 = \| A3 - B3 \|$
Check that S1, S2, and S3 are all within the range of possible values (determined by the maximum and minimum attainable lengths of the spokes).

↓

If the spokes accept velocity control send instructions to them to adjust to lengths S1, S2 and S3 respectively by the time $t_o + \Delta t$.

If the spokes do not accept velocity control estimate the time $\delta t$ required for each spoke to reach the desired length (from the change in spoke length and the spoke specifications) and send out the instruction for that spoke at time $t_o + \Delta t - \delta t$.

↓

At time $t_o + \Delta t$ return to the second step.

FIG. 6D

```
┌─────────────────────────────────────────────────────────────────────┐
│ The coordinate system is given in Fig. 5. Inputs are parameters     │
│ ($\Delta h_x$, $h_{y0}$). $\Delta h_x$ is the desired relative      │
│ offset of the hub from the rim's center in the x coordinate, and    │
│ $h_y$ is the desired absolute height above the ground for y.        │
│ $\Delta t$ is set to the shortest time allowed between commands     │
│ to the spokes.                                                      │
└─────────────────────────────────────────────────────────────────────┘
                                  ↓
┌─────────────────────────────────────────────────────────────────────┐
│ Save the current time as $t_0$. Input data from the rim sensor and  │
│ the hub sensor. Process the sensor data to get $\theta$, $\theta'$, │
│ $\theta''$, $c_x$, $c_x'$, $c_x''$, $c_y$, $c_y'$, $c_y''$ for the  │
│ rim and y, y', y'', $h_y$, $h_y'$ for the hub. Values not reported  │
│ by the sensors are computed from the sensor data using numerical    │
│ differentiation or integration.                                     │
└─────────────────────────────────────────────────────────────────────┘
                                  ↓
┌─────────────────────────────────────────────────────────────────────┐
│ Approximately predict updated values for time $t = t_0 + \Delta t$  │
│ assuming constant acceleration:                                     │
│   $\theta \leftarrow \theta + \theta' \Delta t + \tfrac{1}{2} \theta'' \Delta t^2$ │
│   $c_x \leftarrow c_x + c_x' \Delta t + \tfrac{1}{2} c_x'' \Delta t^2$ │
│   $c_y \leftarrow c_y + c_y' \Delta t + \tfrac{1}{2} c_y'' \Delta t^2$ │
│   $\theta' \leftarrow \theta' + \theta'' \Delta t$                  │
│   $c_x' \leftarrow c_x' + c_x'' \Delta t$                           │
│   $c_y' \leftarrow c_y' + c_y'' \Delta t$                           │
│   $y \leftarrow y + y' \Delta t + \tfrac{1}{2} y'' \Delta t^2$      │
└─────────────────────────────────────────────────────────────────────┘
                                  ↓
┌─────────────────────────────────────────────────────────────────────┐
│ Compute the needed S1, S2 and S3 to get the requested hub           │
│ displacement:                                                       │
│   $A_1 = (R \cos(\theta), R \sin(\theta))$                          │
│   $A_2 = (R \cos(\theta + 120), R \sin(\theta + 120))$              │
│   $A_3 = (R \cos(\theta + 240), R \sin(\theta + 240))$              │
│   $B_1 = (r \cos(y), r \sin(y)) + (\Delta h_x + c_x, h_{y0})$       │
│   $B_2 = (r \cos(y + 120), r \sin(y + 120)) + (\Delta h_x + c_x, h_{y0})$ │
│   $B_3 = (r \cos(y + 240), r \sin(y + 240)) + (\Delta h_x + c_x, h_{y0})$ │
│   $S_1 = \|A_1 - B_1\|$                                             │
│   $S_2 = \|A_2 - B_2\|$                                             │
│   $S_3 = \|A_3 - B_3\|$                                             │
│ Check that S1, S2, and S3 are all within the range of possible      │
│ values (determined by the maximum and minimum attainable lengths    │
│ of the spokes).                                                     │
└─────────────────────────────────────────────────────────────────────┘
                                  ↓
┌─────────────────────────────────────────────────────────────────────┐
│ If the spokes accept velocity control send instructions to them to  │
│ adjust to lengths S1, S2 and S3 respectively by the time            │
│ $t_0 + \Delta t$.                                                   │
│                                                                     │
│ If the spokes do not accept velocity control estimate the time      │
│ $\delta t$ required for each spoke to reach the desired length      │
│ (from the change in spoke length and the spoke specifications)      │
│ and send out the instruction for that spoke at time                 │
│ $t_0 + \Delta t - \delta t$.                                        │
└─────────────────────────────────────────────────────────────────────┘
                                  ↓
┌─────────────────────────────────────────────────────────────────────┐
│ At time $t_0 + \Delta t$ return to the second step.                 │
└─────────────────────────────────────────────────────────────────────┘
```

FIG. 6E

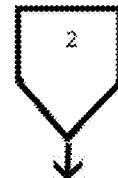
FIG. 6F-1

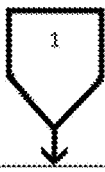

Now solve this constrained minimax problem using one of many well known interative methods:

Find the γ, using the initial guess $γ_0$, that minimizes the maximum of $|S1-S1_0|$, $|S2-S2_0|$, and $|S3-S3_0|$ where:
A1 = ( R cos ( θ ), R sin ( θ ) )
A2 = ( R cos ( θ + 120 ), R sin ( θ + 120 ) )
A3 = ( R cos ( θ + 240 ), R sin ( θ + 240 ) )
B1 = ( r cos ( γ ), r sin ( γ ) ) + ( $Δh_c$ + $c_v$ $h_{v0}$ )
B2 = ( r cos ( γ + 120 ), r sin ( γ + 120 ) ) + ( $Δh_c$ + $c_v$ $h_{v0}$ )
B3 = ( r cos ( γ + 240 ), r sin ( γ + 240 ) ) + ( $Δh_c$ + $c_v$ $h_{v0}$ )
S1 = || A1 - B1 ||
S2 = || A2 - B2 ||
S3 = || A3 - B3 ||
γ < $γ_{max}$ and γ > $γ_{min}$ (where $γ_{max}$ and $γ_{min}$ are the maximum and minimum values of γ allowed by the wheel geometry). S1, S2, and S3 are all within the range of possible values (determined by the maximum and minimum attainable lengths of the spokes). One of the many ways to solve this common class of problems is an iterative quasi-Newton method. The initial value for γ is $γ_0$. By varying γ this method can increase the speed of adjusting the hub's relative position.

If the spokes accept velocity control send instructions to them to adjust to lengths S1, S2 and S3 respectively by the time $t_0$ + Δt.

If the spokes do not accept velocity control estimate the time δt required for each spoke to reach the desired length (from the change in spoke length and the spoke specifications) and send out the instruction for that spoke at time $t_0$ + Δt - δt.

At time $t_0$ + Δt return to the second step.

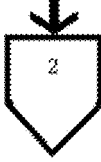

FIG. 6F-2

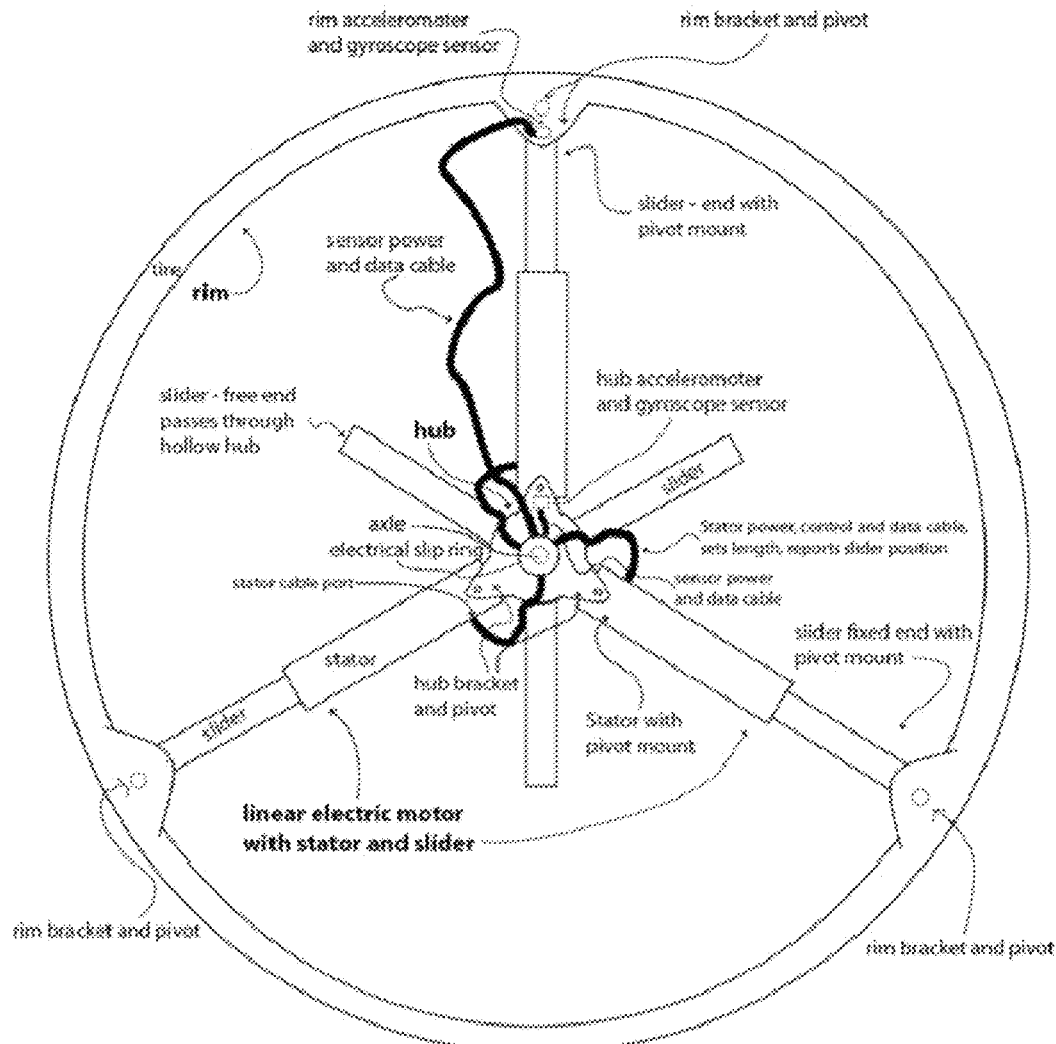

Unstaged linear electric motor wheel with "radial design" hub centered. Because the spokes have a constant length the hub is attached to the stators that move up and down on the sliders. This changes the effective length of the spoke between the hub and the rim while the rest of the spoke protrudes past the hub. This needs a special hub design. The hub is constructed from two plates with empty space in between allowing the spokes to run straight through middle of the hub.

FIG. 9A

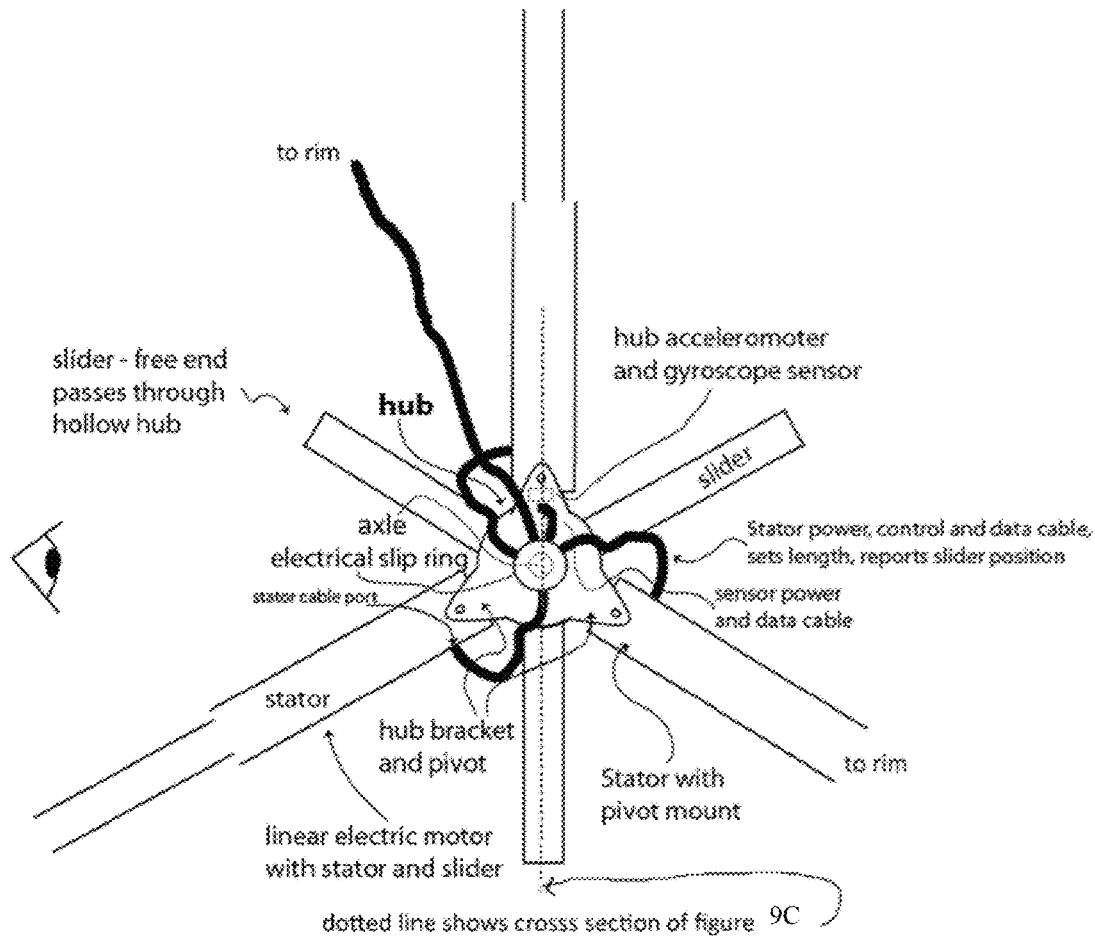

The spokes pass thourgh the center of the hub. In this plan the stator is pinned to the hub bracket at the end of the stator farthest from the rim. The pin can alternatively be located at the end nearest to the rim or somehwere in the middle. The choice of pin location on the stator is to equalize the positive and negatie displacement distances of the pin from the rim, which depends on the exact relationship between the stator length, the slider length, and the hub radius.

FIG. 9B

WHEEL WITH AN INTELLIGENT SUSPENSION SYSTEM

CROSS-REFERENCE TO RELATED APPLICATIONS

This Application claims the benefit of priority of U.S. Utility Provisional Patent Application 62/162,719 filed May 16, 2015, the entire disclosure of which is expressly incorporated by reference in its entirety herein.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention relate to a wheel with an intelligent suspension system.

Description of Related Art

Conventional suspension systems used within a rim of a wheel are well known and have been in use for a number of years. Regrettably, most are passive systems that may use springs or the like that do not intelligently vary their state or action in response to varying surfaces upon which a wheel rides.

Passive systems simply respond to changing topography of a riding surface based on their inherent properties rather than an intentionally controlled response, which provide for a poor ride quality. Non-limiting examples of inherent (or structural or built-in) properties of passive systems (for example, of a spring) may include built-in maximum compression and or tensile ratings, response time, etc. that are already engineered into the spring.

Further, known conventional passive suspension systems dampen forces transmitted from the wheel hub to the wheel rim, slowing braking and or acceleration. In other words, the force that is supposed to be transmitted from the hub to the rim is partially absorbed by the passive suspension systems, which is very inefficient.

Accordingly, in light of the current state of the art and the drawbacks to existing passive suspensions systems mentioned above, a need exists for a wheel with an intelligent suspension system and a method of making thereof that would provide an intentionally controlled response to varying riding surface topographies for a controlled ride without sacrificing efficiency.

BRIEF SUMMARY OF THE INVENTION

A non-limiting, exemplary aspect of an embodiment of the present invention provides a wheel that includes:
 a hub;
 a rim; and
 a set of spokes with dynamically adjustable spoke lengths;
 wherein: the hub is associated with the rim by the set of spokes that rapidly adjust spoke lengths to change hub position, orientation, and linear and angular accelerations within the rim.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIGS. 6A to 6I are a non-limiting, exemplary illustration of flowcharts that detail controlling and adjusting of spokes lengths in accordance with one or more embodiments of the present invention;

FIGS. 9A to 9C are non-limiting, exemplary illustrations of a wheel using single-staged linear electric motor with a "radial hub" configuration in accordance with one or more embodiments of the present invention.

DETAILED DESCRIPTION OF THE INVENTION

Figure 1A:
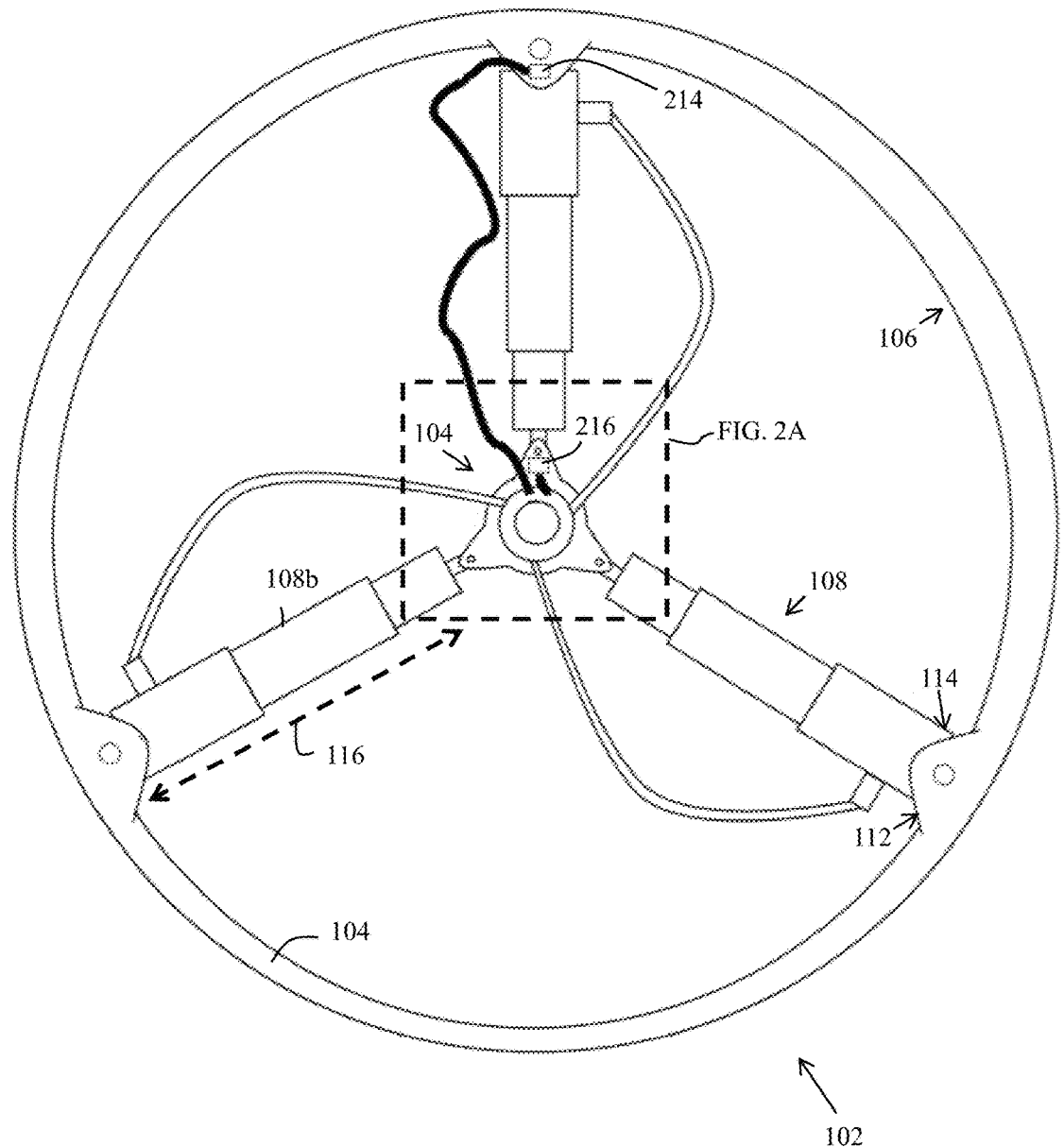
FIGS. 1A and 1B are non-limiting, exemplary illustrations of a wheel in accordance with one or more embodiments of the present invention, with FIG. 1A showing a hub of the wheel centered within a rim of the wheel and FIG. 1B showing the hub of the wheel displaced from the center of the rim.

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

For purposes of illustration, programs and other executable program components are illustrated herein as discrete blocks, although it is recognized that such programs and components may reside at various times in different storage components, and are executed by the data processor(s) of the computers. Further, each block within a flowchart may represent both method function(s), operation(s), or act(s) and one or more elements for performing the method function(s), operation(s), or act(s). In addition, depending upon the implementation, the corresponding one or more elements may be configured in hardware, software, firmware, or combinations thereof.

In the description given below and or the corresponding set of drawing figures, when it is necessary to distinguish the various members, elements, sections/portions, components, parts, or any other aspects (functional or otherwise) or features or concepts or operations of a device(s) or method(s) from each other, the description and or the corresponding drawing figures may follow reference numbers with a small alphabet character such as (for example) "spokes 108a, 108b, and etc." If the description is common to all of the various members, elements, sections/portions, components, parts, or any other aspects (functional or otherwise) or features or concepts or operations of a device(s) or method(s) such as (for example) to all spokes 108a, 108b, etc., then they may simply be referred to with reference number only and with no alphabet character such as (for example) "spokes 108."

Throughout the disclosure, references to a wheelchair or a wheel of the wheelchair are meant as illustrative, convenience of example, and for discussion purposes only. That is, the present invention should not be limited to the use of the wheelchair or the wheels of the wheelchair but may also be used to replace wheels of other devices, vehicles that use wheels, etc.

One or more embodiments of the present invention provide a wheel with an intelligent suspension system and a method of making thereof that enables an intentionally controlled response to varying riding surface topographies (bumps, curbs, steps (or stairs), potholes, etc.) for a controlled ride without sacrificing efficiency.

One or more embodiments of the present invention provide a wheel with an intelligent suspension system and a method of making thereof comprised of a wheel with a hub that is associated with a rim of the wheel by a set of a dynamically adjustable spokes that are electronically controlled to rapidly and precisely adjust individual spoke lengths and hence, hub position, and hub linear and angular accelerations. Stated otherwise, the electronic control of the intelligent suspension system may control the precise location, position, and orientation of the hub with respect to the rim of the wheel and the ground using the dynamically adjustable spokes to provide a desired motion for a load while traversing over a variety of riding surface topographies. Non-limiting examples of a load may include anything that is supported by the wheel (a car, bicycle frame, a wheelchair, etc.).

One or more embodiments of the present invention provide a wheel with an intelligent suspension system and a method of making thereof that may facilitate riding over curbs or stairs while dynamically maintaining the load at a generally constant elevation in relation to ground, without the load lifted against gravity and, without excess torque to pivot wheel over the curb. For example, change may be detected in vertical position by one or more sensors in the hub as the wheel rises up over the curb. It should be noted that future change may also be predicted over a very short time period using approximation formula (detailed below), for example Newton's equations of motion for constant acceleration. Using these approximations the hub is moved to maintain its vertical position approximately constant relative to the ground, with the hub maintaining the load height very nearly constant by controlling the lengths of the spokes. In other words, the spokes do the work of lifting the load against the force of gravity and hence, required power to generate energy to move over an obstacle by a human or animal powered vehicle is substantially reduced. It should be noted that for a vehicle propelled by a motor providing forward thrust, for example by turning wheels or by reaction force, climbing a stair or obstacle causes a great deal of shock to the load and to the wheel, and may not be possible, because the force is in the forward direction. In this invention though the hub is powered upward against gravity so going up the step or obstacle is easily accomplished without shocks.

Further, the hub may be moved horizontally closer to the curb by the electronic control to greatly reduce required torque necessary to pivot the wheel up over the curb. As the wheel lifts off the lower level even though the load is not being lifted it must be supported against the pull of gravity by a static force that does no work (W=F× d which is work equals force times distance, and work is the energy output.) If the center of gravity of the vehicle is moved forward toward the lip of the step more of this static force comes from the ground, and as soon as the center of gravity of the load is over the step itself, which happens before the wheel mounts the step, an upward static force will not be needed any more. If the hub is allowed to drop after the center of gravity of the load is over the step gravity will even help to pull the wheel up and over the step.

Once the wheel is on the curb (detected by the sensors), the spokes lengths may gradually be readjusted to restore the hub to its original position (which is generally in the center of the wheel). Depending on the size of the wheel and the dimensions of the steps, the cycle may be repeated for an entire flight of stairs. The same procedures function or operate in time reverse for descending a flight of stairs or a curb, providing a safe, easy, comfortable, and smooth motion.

One or more embodiments of the present invention provide a wheel with an intelligent suspension system and a method of making thereof that may facilitate a smooth ride over a bumpy surface where the hub of the wheel is instantaneously and continuously repositioned in relation to the rim and or ground by adjusting the spoke lengths. Continuous readjustment of the hub position maintains hub (and hence the load) at a generally constant trajectory (elevation or height), regardless of variations on riding surface topography. As the wheel is pushed up or down by irregularity in the surface over which it travels, the sensors in the hub detect a change in vertical position, and future change may be predicted over a very short time period using the approximation formula (e.g., Newton's equations of motion) for constant acceleration. Using these approximations the hub is moved so as to keep its vertical position approximately constant relative to the ground. Accordingly, impulsive forces (e.g., vertical shocks) to the load due to variations on riding surface topography may be canceled by rapid adjustment of the spoke lengths. It should be noted that the degree of cancellation of vertical shocks may be adjusted if it is desired that the load experience a "lively" ride. It should further be noted that hub control method disclosed may also be applied in horizontal direction to cancel horizontal shocks (e.g., due to extreme acceleration or deceleration).

One or more embodiments of the present invention provide a wheel with an intelligent suspension system and a method of making thereof that may facilitate to automatically adjust the position of the hub due to changes in load weight. That is, the hub position is varied when weight of the load changes by varying the spoke lengths to generally reposition the hub in the general center of the rim or other desired position. This repositioning of the hub to a desired location within rim allows for change in the overall center of gravity of the load and vehicle, providing a more efficient and stable system.

One or more embodiments of the present invention provide a wheel with an intelligent suspension system and a method of making thereof that may facilitate to intentionally lower the center of gravity of the load and vehicle by lowering hub position to improve stability, handling, and cornering. For example, a special handling mode may be provided that lowers center of gravity when cornering at certain speeds. Therefore, the hub position may be adjusted in accordance with different road conditions like a rough terrain or smooth road (such as a paved highway). For example, when driving off road the hubs may be lifted so the vehicle may travel over large obstacles like rocks, logs, and irregularities in the surface. Alternatively, when driving at high speeds on & very smooth surfaces the hubs may be lowered to reduce air friction and increase mileage and to improve vehicle stability at high speeds.

One or more embodiments of the present invention provide a wheel with an intelligent suspension system and a method of making thereof that may detect that the hub is moved forward more slowly or quickly than it should be according to its rotational speed, which means the wheel is slipping during acceleration/braking respectively. If the wheel is slipping during braking, the hub may be allowed to rotate faster than the rim because the hub has a certain degree of freedom of rotation relative to the rim, between 20 and 60 degrees depending on the implementation, which means the rim may be slowed down more gradually than the axle to help prevent skidding. The same in reverse applies to acceleration skidding.

One or more embodiments of the present invention provide a wheel with an intelligent suspension system and a method of making thereof that may facilitate detection of sudden deceleration or acceleration of the vehicle at which point, the hub may be repositioned and moved and or rotated to spread the resulting shock from deceleration or acceleration over time. For example during sudden deceleration, the hub may be moved forward so the momentum of the load (e.g. passenger(s)) is slowed down (or reduced) over a longer period of time.

One or more embodiments of the present invention provide a wheel with an intelligent suspension system and a method of making thereof that may facilitate the use of a commode or lowering or rising of a wheelchair for convenience. For example, the hub of the wheel may be raised to elevate the wheelchair seat above a toilet seat or a large obstacle (e.g., a rock) in between the wheels or lowered to facilitate dismounting from the wheelchair.

One or more embodiments of the present invention provide a wheel with an intelligent suspension system and a method of making thereof that may facilitate propelling the vehicle. For example, the vehicle may be propelled forward or backward by manipulating the location of the hub (by appropriately varying spoke lengths) in cyclic pattern. There are many trajectories for the hub that work for this purpose, for example lifting the hub up and forward, so the force of gravity acts to pull down on the load and hence drive the wheel forward. When the hub falls to directly below the center of the rim, it may than be lift up to its original position and repeat the cycle. The same works a backward motion. This operation may be used to provide a boost of power in a wheelchair when moving up a ramp, or to help brake the vehicle when moving down a ramp, or to provide propulsion in an emergency.

One or more embodiments of the present invention provide a wheel with an intelligent suspension system and a method of making thereof that may facilitate soothing and calming effect. For example, the wheel hub may be moved in a cyclic trajectory to provide a soothing, comforting or calming effect to the passenger, as does a rocking chair. The trajectory may be simply back and forth, or in semicircle so that the hub mimics the trajectory of a pendulum, with the wheels either locked or unlocked so that the whole chair glides forward and backward. The hub may also be rapidly vibrated to produce a massage effect on the passenger.

It should be note that a manual control (or user interface) may be provided to instruct a computer of the present invention (detailed below) to enter specific modes—turn OFF, turn ON, move up/down stairs, move up/down ramps, lift or lower load, propel forward/backward, increase or decrease shock absorbency, etc. The computer may also automatically detect many of these modes of operation itself based on sensor feedback. The present invention is only directed to a wheel with an intelligent suspension system and is not concerned with user interface or implementing a user interface.

Figure 1B:
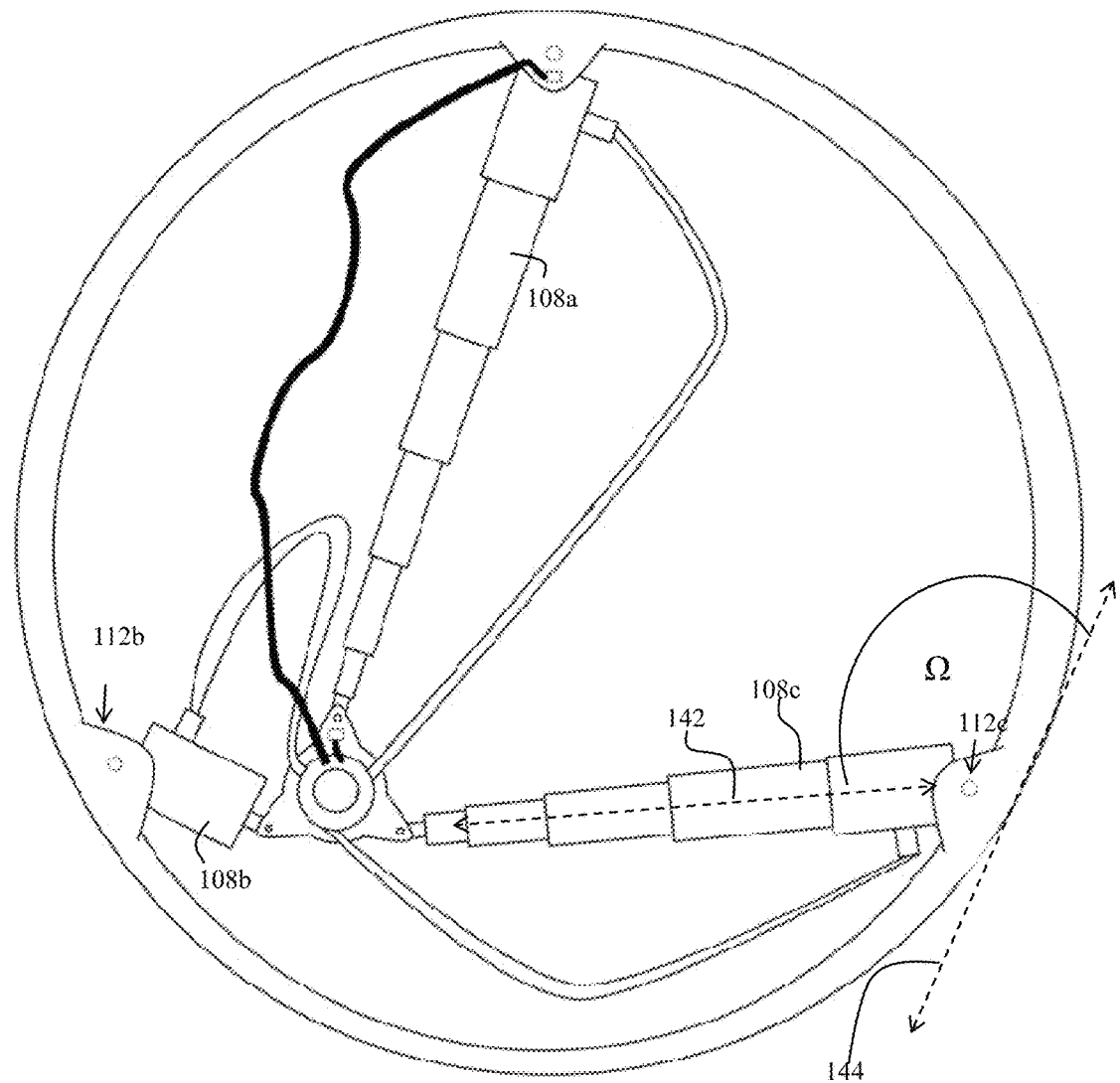

FIGS. 1A and 1B are non-limiting, exemplary illustrations of a wheel in accordance with one or more embodiments of the present invention, with FIG. 1A showing a hub of the wheel centered within a rim of the wheel and FIG. 1B showing the hub of the wheel displaced from the center of the rim. As illustrated, a wheel 102 is comprised of a hub 104, a rim 106 and a set of spokes 108 that have spoke lengths 116 that are dynamically adjustable. In this non-limiting, exemplary embodiment, the set of spokes 108 may be based on pneumatic or hydraulic based systems.

Hub 104 is associated with rim 106 by set of spokes 108 that rapidly adjust spoke lengths 116 to change hub position, orientation, and linear and angular accelerations within the rim 106 (best shown in FIG. 1B). As further detailed below, one or more sensors 214 and 216 associated with hub 104, rim 106, and may be set of spokes 108 may be used to provide information to a microcontroller unit (MCU) 218 (FIGS. 2A to 2C) that receives sensory signals 220 from the one or more sensors 214 and 216, and transmits control signals 222 to the set of spokes 108 to dynamically control spoke lengths 116 of the set of spokes 108. In this non-limiting, exemplary embodiment, the one or more sensors 214 and 216 are respectively associated with hub 104 (e.g., hub sensor 214) and rim 106 (e.g., rim sensor 216). Illustrated sensors 214 and 216 are Inemo Inertial Module 3*d* Accelerometer And 3*d* Gyroscope LSM330DLC (on wheel) Rim Sensor for Linear Acceleration & Angular Rate.

All three spokes 108 shown in FIG. 1A are at the same length, which is in between their minimum, fully contracted length and their maximum, fully extended length. This places the hub at the center of the wheel in the wheel plane. All the spokes lie along with the hub in the plane of the drawing. The amount which the hub 104 can rotate relative to the rim 106 without wheel components colliding with each other is determined by the geometry of the components and varies with the displacement of the hub. As best illustrated in FIG. 1B, the lower left spoke 108*b* is fully contracted and the other two spokes 108*a* and 108*c* are extended to near their maximum. This places hub 104 near rim attachment point 112*b* of the lower left spoke 108*b*. By adjusting the lengths 116 of the three spokes 108 the hub 104 can by dynamically positioned anywhere within the plane of the wheel at a distance from the center from 0 to a maximum determined by the geometry of the components.

The six spokes (three on each wheel) in this particular design are bearing the vehicle load. In choosing the spokes for a particular application the necessary force to lift the vehicle load must be calculated. It is preferable to choose a model of spoke that exerts both compressive and tensile force so that all three spokes can help to support the load in any wheel orientation as it rotates.

As illustrated in FIGS. 1A and 1B, as the wheel rotates to clockwise, the attachment point 112*b* on the lower left will rise up on the left and the attachment point 112*c* on the lower right will drop. To maintain hub 104 at the same relative location, as the wheel moves the spoke 108*b* on the lower left will have to get longer while the spoke 108*c* on the lower right will have to get shorter. The top spoke 108*a* will have to get slightly longer. The computer programs/electronic control flowcharts with equations that are needed to control the spoke lengths 116 for various applications are detailed below.

It should be noted that the pneumatic spokes are comprised of pneumatic cylinders that are moved via pressurized gas delivered through gas delivery tubes from a pressurized gas tank using air pump to move cylinders and hence, adjust spoke lengths—contract or expand them by varying air pressure. Hydraulic spokes are comprised of hydraulic cylinders that are moved by liquid delivered through liquid delivery tubes from a liquid tank using liquid pump to move cylinders and hence, adjust spoke lengths—contract or expand them by varying liquid delivered.

It should be noted that depending on the type and model of spokes chosen, they may also have internal sensors that report their actual extended length either as digital or analog signals. These signals may be transmitted through the electrical slip ring on the hub to the MCU 218 and/or the cylinder control modules if these are used. However, because of the rim and hub sensors 214 and 216 described below, the MCU may also calculate the current length of each spoke from the relative position and orientation of the hub and the rim. This way, the length sensors of the spokes are not required in the spokes. However use of length sensors simplify the control algorithms and improve the accuracy of the hub control. None of the embodiments, methods or procedures require the spokes to report their lengths. If the specific spoke components do provide highly accurate lengths to the controller then that information can be used to improve the accuracy of calculations described below. The calculated present lengths of spokes can always be replaced by, or averaged with, the reported lengths to improve the accuracy of those values. In the exemplary methods and procedures described here as the spoke lengths are calculated from the hub and rim sensor data.

Figure 2A:
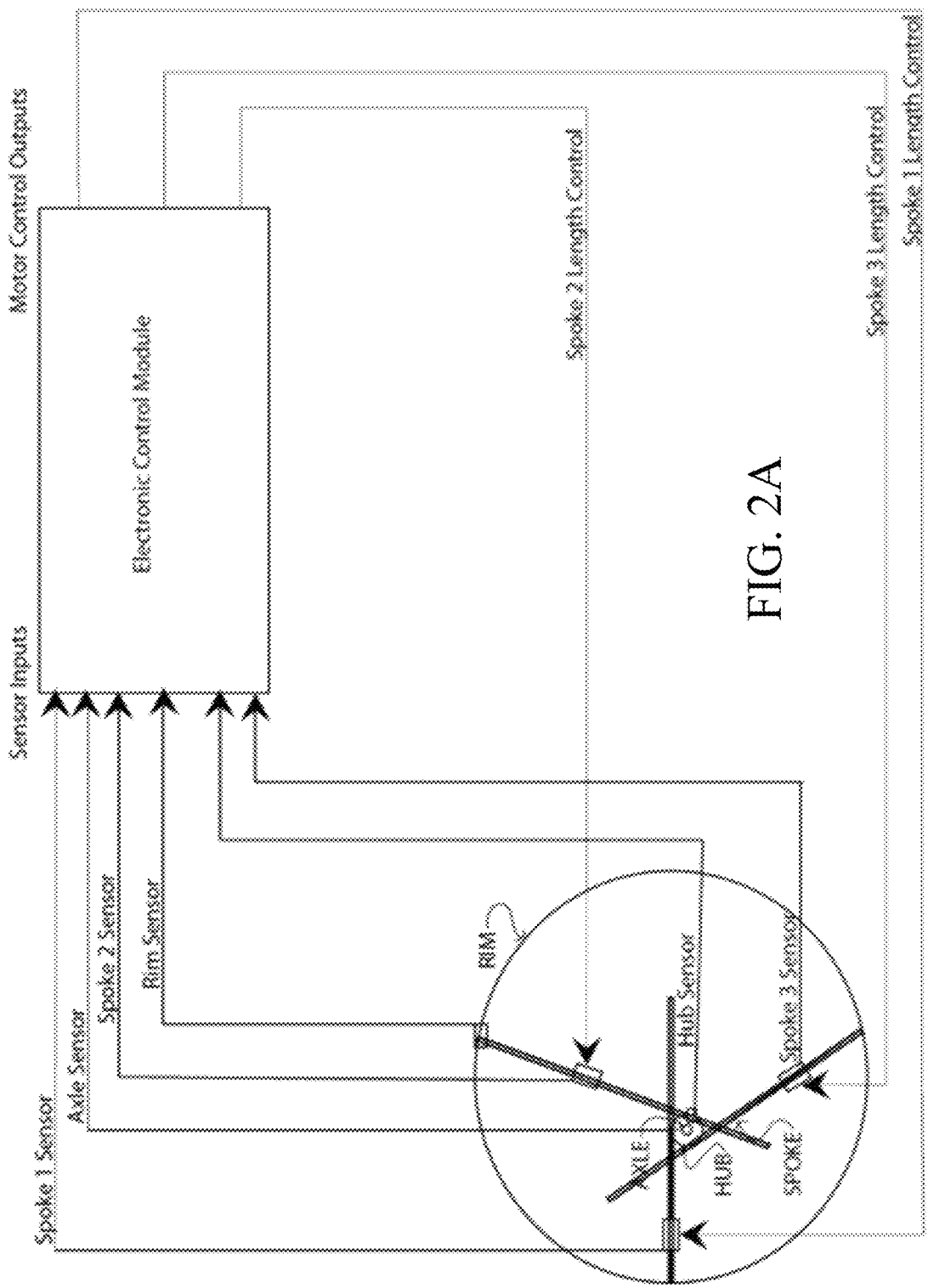
FIG. 2A is a non-limiting, exemplary systems overview, schematically illustrating electronics control and sensory systems of the intelligent suspension system of the wheels illustrated in FIGS. 1A and 1B in accordance with one or more embodiments of the present invention.
Figure 2B:
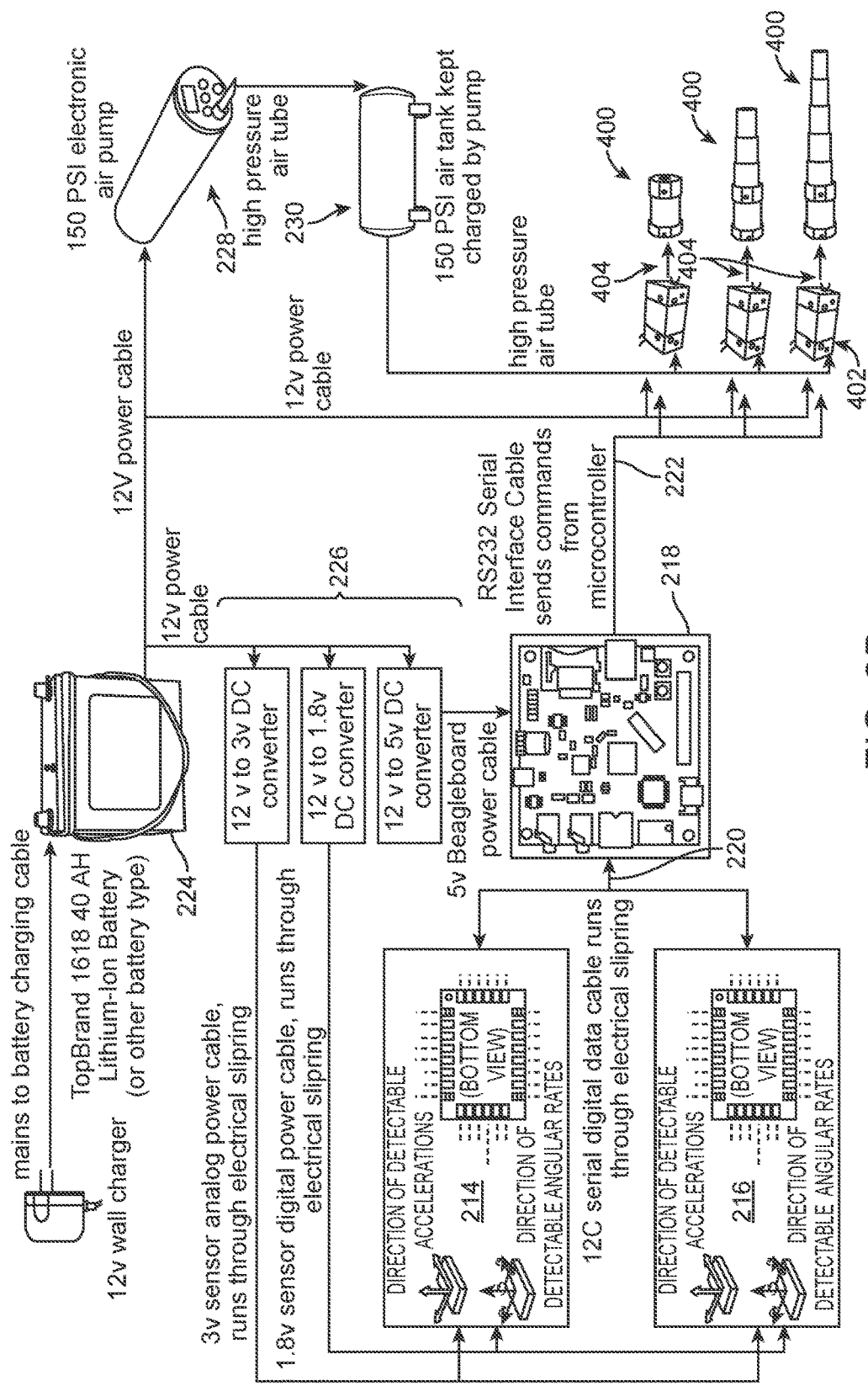
FIG. 2B is a non-limiting, exemplary systems overview, illustrating major components of the intelligent suspension system of the wheels illustrated in FIGS. 1A to 2A in accordance with one or more embodiments of the present invention.

FIG. 2A is a non-limiting, exemplary systems overview, schematically illustrating electronics control and sensory systems of the intelligent suspension system of the wheels illustrated in FIGS. 1A and 1B in accordance with one or more embodiments of the present invention. FIG. 2B is a non-limiting, exemplary systems overview, illustrating major components of the intelligent suspension system of the wheels illustrated in FIGS. 1A to 2A in accordance with one or more embodiments of the present invention, and FIG. 2C is a non-limiting, exemplary illustration of a use of the wheel illustrated in FIGS. 1A and 2B on a wheelchair in accordance with one or more embodiments of the present invention.

Figure 2C:
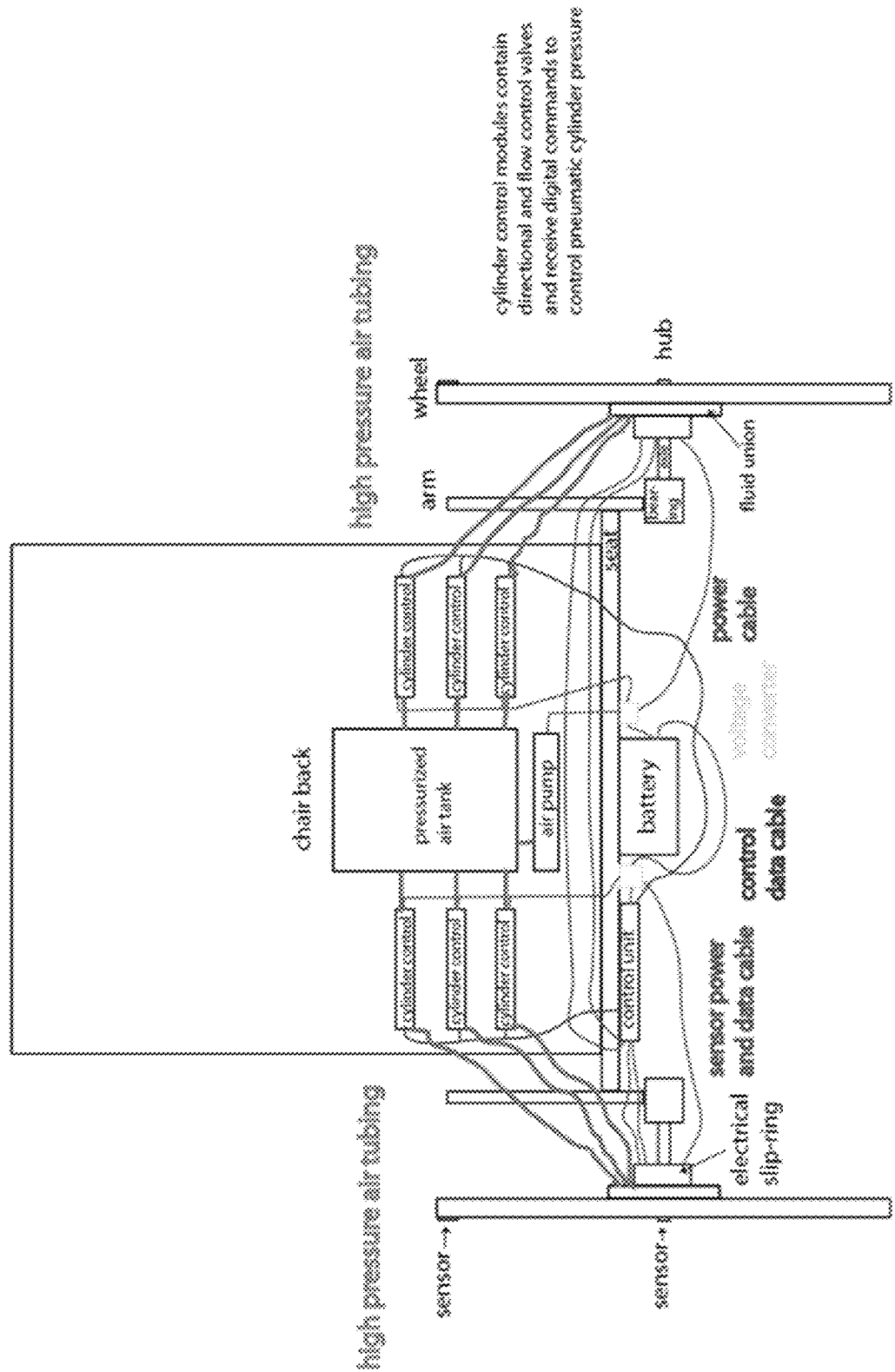
FIG. 2C is a non-limiting, exemplary illustration of a use of the wheel illustrated in FIGS. 1A and 2B on a wheelchair in accordance with one or more embodiments of the present invention.

As illustrated in FIGS. 2A to 2C, one or more sensors are associated with the hub, the rim, and may also be with the set of spokes. A microcontroller unit (MCU) 218 receives sensory signals from the one or more sensors, and transmits control signals to the set of spokes to dynamically control spoke lengths of the set of spokes. As illustrated in FIGS. 1A to 2C, the intelligent suspension system includes MCU 218 and sensors 214 and 216 powered by a battery 224 via a set of step-down converters (e.g., DC-to-DC) 226. For this non-limiting, exemplary instance, the intelligent suspension system may include a pump 228 and tank reservoir 230, which comprise one of a pressurized air or gas tank (if pneumatic spokes are used) or a hydraulic fluid reservoir (if hydraulic spokes are used). FIG. 2B shows a Beagleboard 32-bit single-board computer/microcontroller 218 running Linux with 12C and RS232 serial interfaces, and 512 MB memory (or similar microcontroller board) runs the control procedures in C programming language.

The sensor signals and any electric power requirements from battery 224 must be transmitted from the intelligent suspension system on the load platform to the rotating wheel. As best illustrated in FIG. 2C, to connect electrical wires from the stationary elements on the load platform (e.g., seat of the wheelchair shown in FIG. 2C) to the rotating elements on the wheel, hub 104 contains an electric slip ring, a well known device. To connect fluids or gasses from the intelligent suspension system, e.g. gas or hydraulic fluid, to the spokes, a well known device known as a rotating union or fluid union is employed. In the exemplary embodiments below a combined rotary union and electrical slip ring assembly is employed. These are widely available in many configurations. They reduce the complexity of the hub.

Rotary Systems Inc., Moflon Technology Co. Limited, Dynamic Sealing Technologies, Inc, and SAV Spann-Automoations-Normteiltechnik GmbH all manufacture various models of combined fluid union and electric slip ring assemblies. As detailed below, in the case of electrically powered spokes only an electrical slip ring is needed.

Sensors 214 and 216 may comprise of accelerometers and gyroscope sensors that are commonly available to report on the hub's location and rotation to the MCU 218. Integrating the accelerations results in the position of hub 104 and its angular orientation. The spokes 108 may include sensors that report their lengths, many of them include such sensors. Depending on the type of sensor used, some may report (linear or angular) acceleration, some also may report velocity and position. The same sensors may also include capabilities for both linear and angular motion detection. It should be noted that if a sensor detects only acceleration, then velocity and position may be obtained by numerical integration over time, and vice versa (e.g., by using numerical differentiation) in well known conventional methods.

It should be noted that the various types of spokes 108 used throughout the disclosure are well known off-the-shelf products. Non-limiting examples of spokes 108 illustrated in FIGS. 1A to 2C may include those manufactured by ERGO-HELP, INC, model number EHTC.5SP.9-STAGE, with ERGO-HELP EHTC EHTC_5DPL-1×5×17 cylinders. FIG. 2B shows electronic control circuitry for pneumatic cylinder embodiment. Only the two sensors and the three cylinders are located on the rotating wheel. Electrical connections are made to components on wheel through electrical slipring on hub. Air tube connections are made to components on wheel through fluid union on hub. Shown in FIGS. 2B is Three ERGO-HELP EHTC_5DPL-1×5×17 double-acting telescoping five stage pneumatic cylinders 400 function as adjustable high power spokes, shown in different stages of expansion. Diameter 5.4", minimum length 5.6", maximum length 23.6". Approximately 600 lb/cylinder push, 100 lb pull; can ascend an 8" step on a 30" hub. (On wheel.) Also illustrated are three Ergo-help EHPC-6.EDP bi-directional electronically controlled actuation and speed controls 402 for double-action pneumatic cylinders include needed directional valves and flow control values (On chair.) Cylinders may have varying number of stages and dimensions. Because these are double acting cylinders they can exert an upward pull on the hub, against gravity, when on top of the wheel. This is preferable since the vehicle load can be distributed among all three or more spokes. As air/fluid is pumped in to the cylinder (pneumatic or hydraulic based) the stages are successively extended thus making the cylinder longer. As shown, high pressure air tubes 404 power the cylinders, they run through a fluid union. Each model of cylinder used is rated for the force it may exert and the speed with which it can change length. The ERGO-HELP, INC product catalog provides extensive details on the operating parameters of this pneumatic spoke and how it is controlled.

Another non-limiting example of a type of spoke 108 that may be used is a hydraulic cylinder. These use liquid (e.g., water, oil, etc.) to pump up the telescoping cylinders. They are more suitable for larger applications and heavier vehicles because they can provide more power but are larger, heavier and noisier. The design is the same as described here for a pneumatic cylinders except the air tubes, air pump, and pressurized air tank as described are replaced with liquid tubes, a liquid pump, and a liquid reservoir.

Still another non-limiting example of a type of spoke 108 that may be used are well known linear electric motors in which a magnetic slider cylinder moves inside a hollow tube wrapped in coiled electrical conductors which function as a series of electromagnets. An embodiment using linear motors is described below. Linear motors are quiet, small and fast, which makes them suitable for smaller, lower weight applications. They have the advantage of not needing a gas or liquid pressure pump but they are also not as strong. They do require special hub designs detailed below because their overall length cannot change. They are available commercially in many different sizes and parameters. Single stage linear motors can also be constructed using internal screws, rotary motors, and other technologies.

Another non-limiting example of a type of spoke 108 that may be used are well known electric multi-staged pillars or cylinders. These can use well known different types of internal motors, such as linear electric motors or rotational motors operating screws. Because they change their overall length they can use the same hub design as pneumatic and hydraulic cylinders.

It should be noted that different sizes of wheel and force and speed requirements apply for different applications of the invention. For example if used in a motorized vehicle like an automobile or truck the wheels would be larger and the weight greater, requiring larger and stronger cylinders. The wheel may be adapted to any vehicle including bicycles or rocket ship transport vehicles. The appropriate technology for the spokes may be chosen according to the size, speed and force requirements for that vehicle.

Figure 3A:
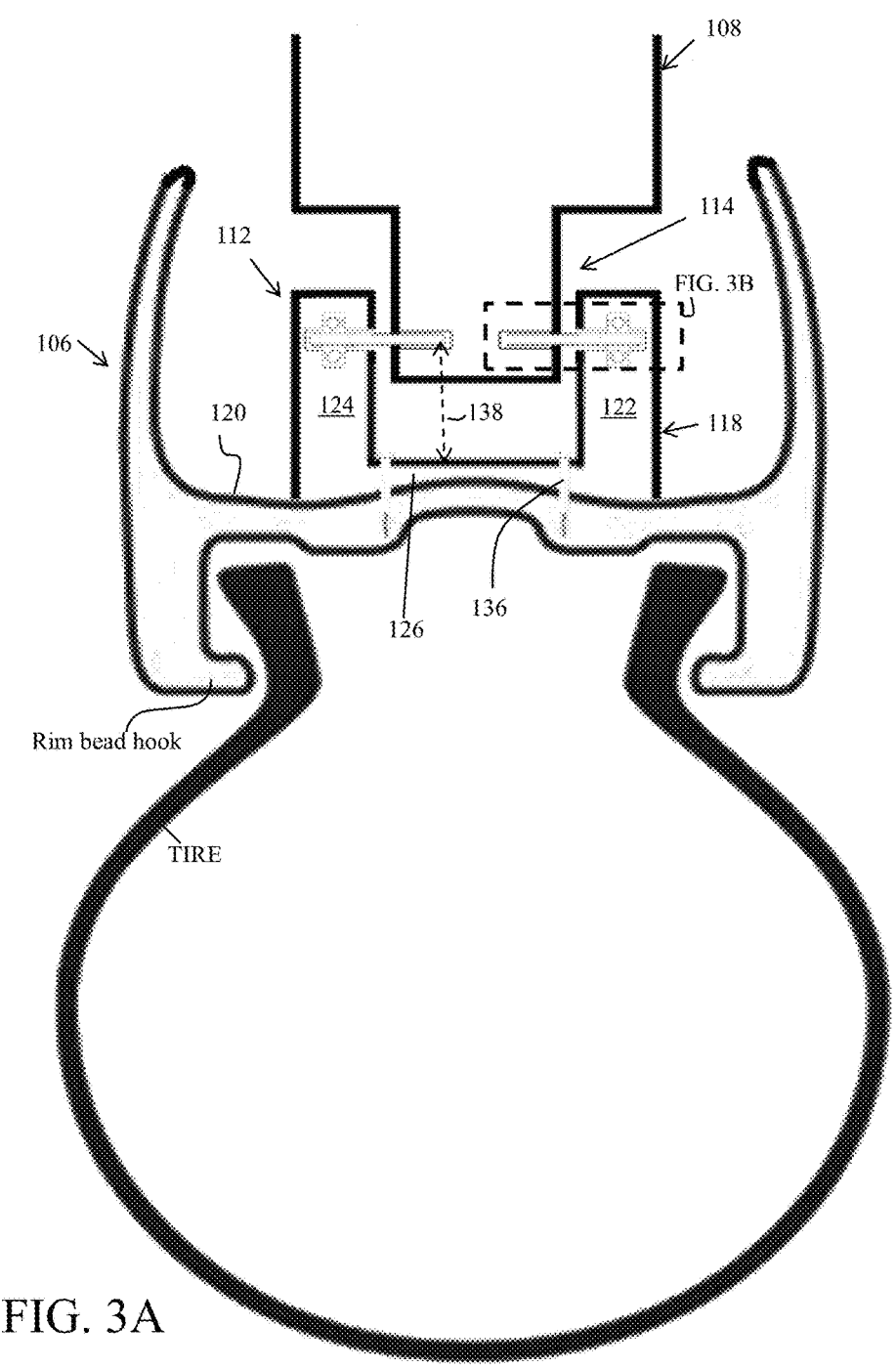
FIGS. 3A and 3B are non-limiting, exemplary illustrations of enlarged views of various aspects of the rim of the wheel and intelligent suspension system of the wheels illustrated in FIGS. 1A to 2C in accordance with one or more embodiments of the present invention.
Figure 3B:
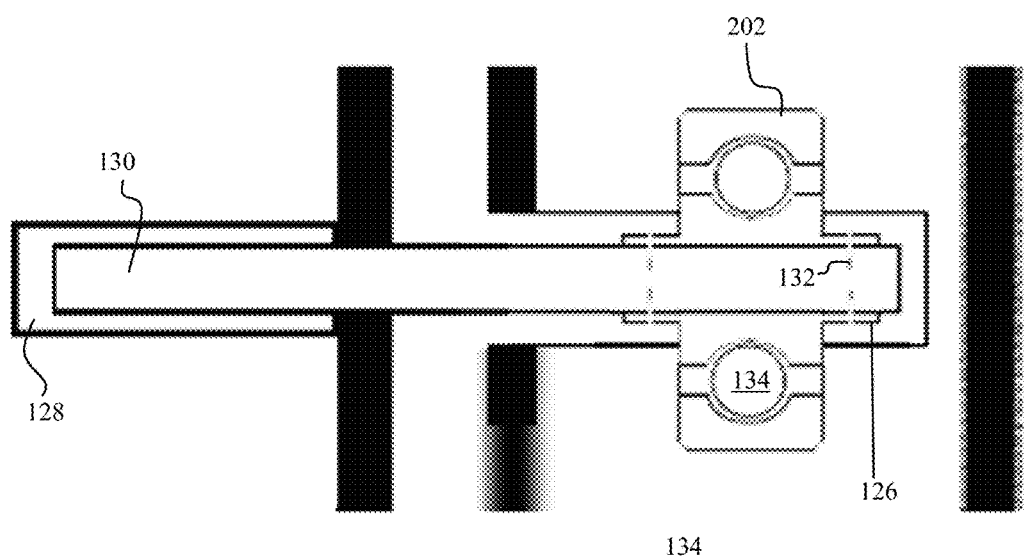
Figure 4A:
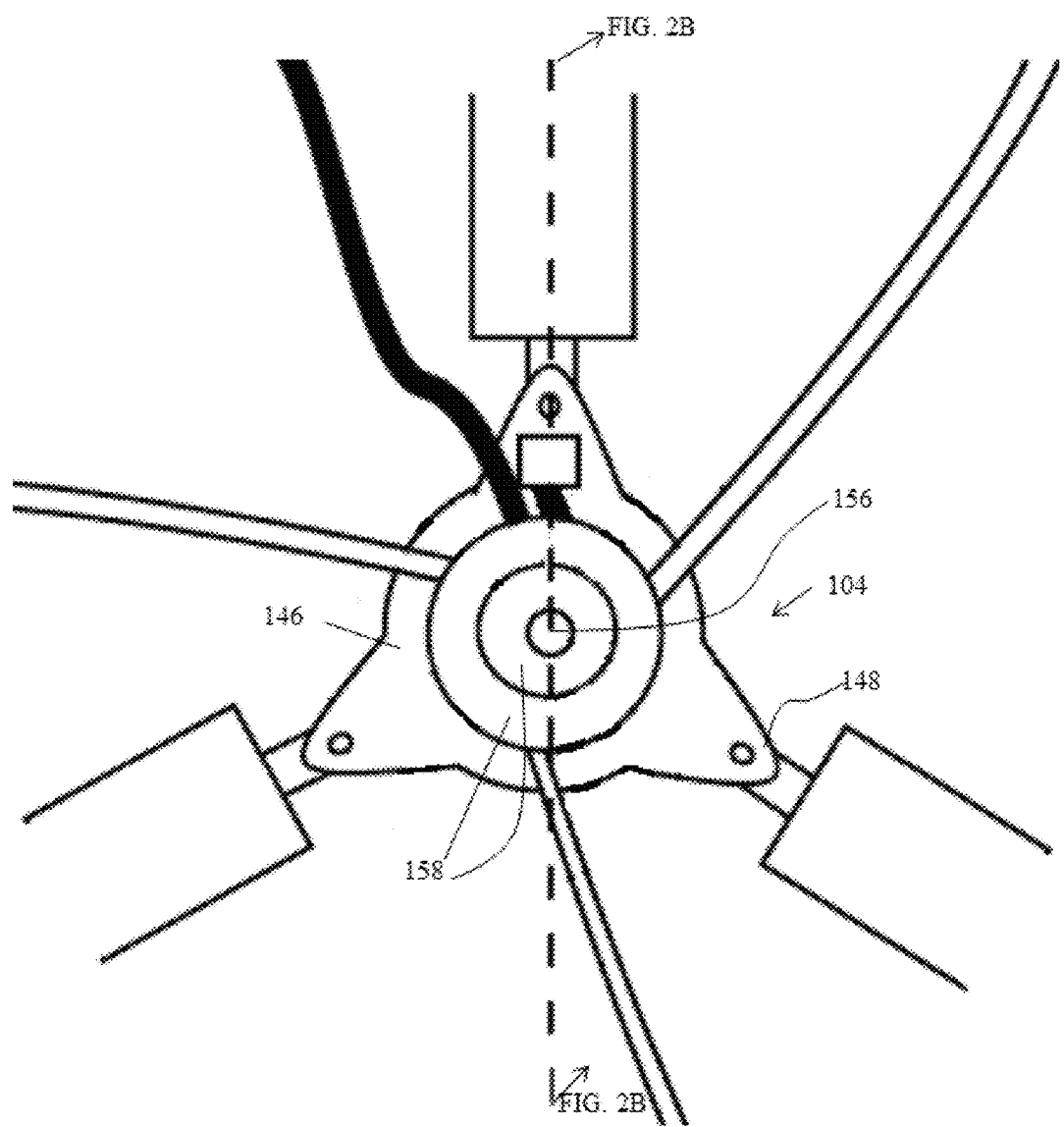
FIGS. 4A to 4E are non-limiting, exemplary illustrations of enlarged views of various aspects of the hub of the wheel and intelligent suspension system of the wheels illustrated in FIGS. 1A to 3B using free axle configuration in accordance with one or more embodiments of the present invention.
Figure 4B:
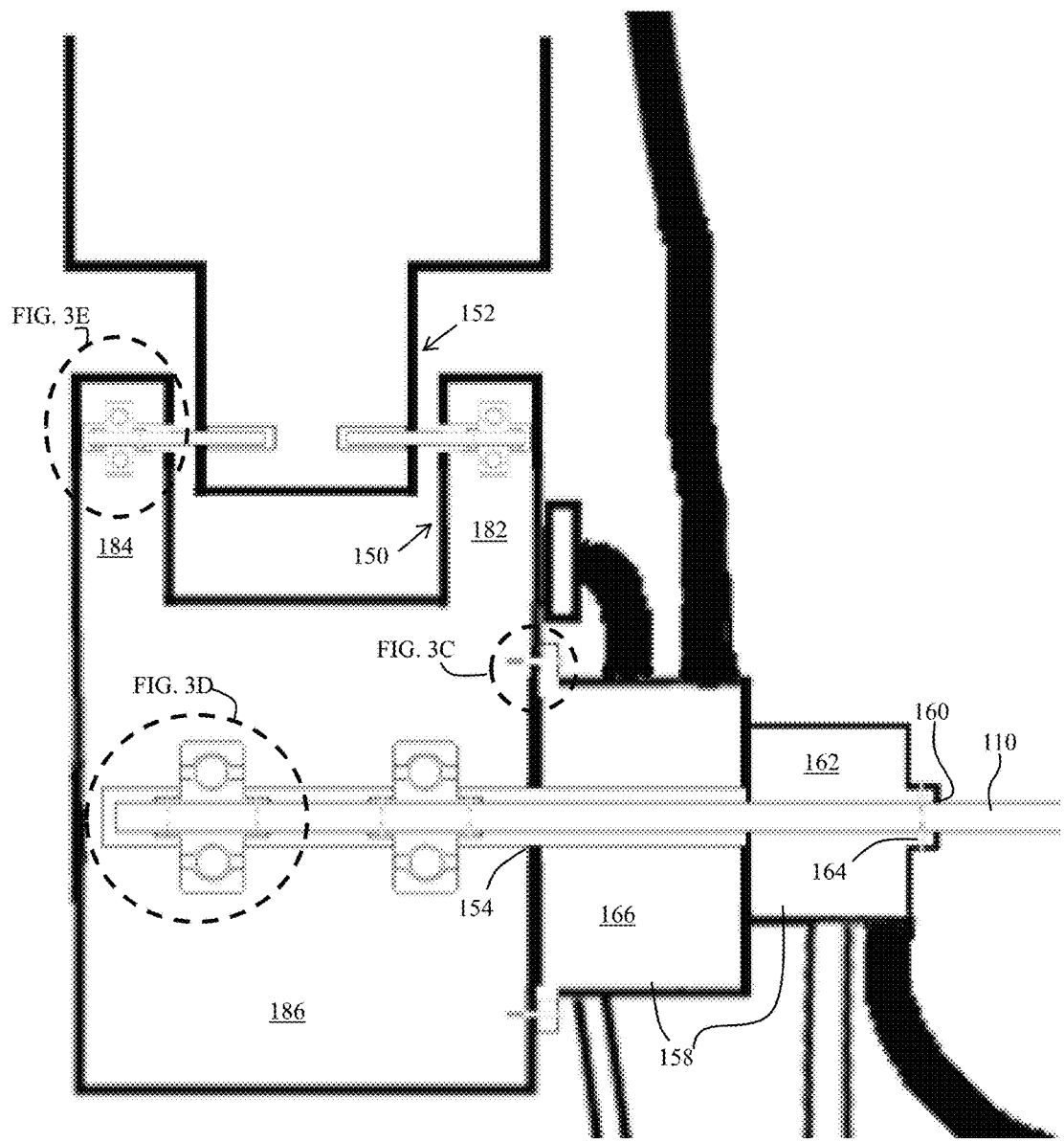
Figure 4C:
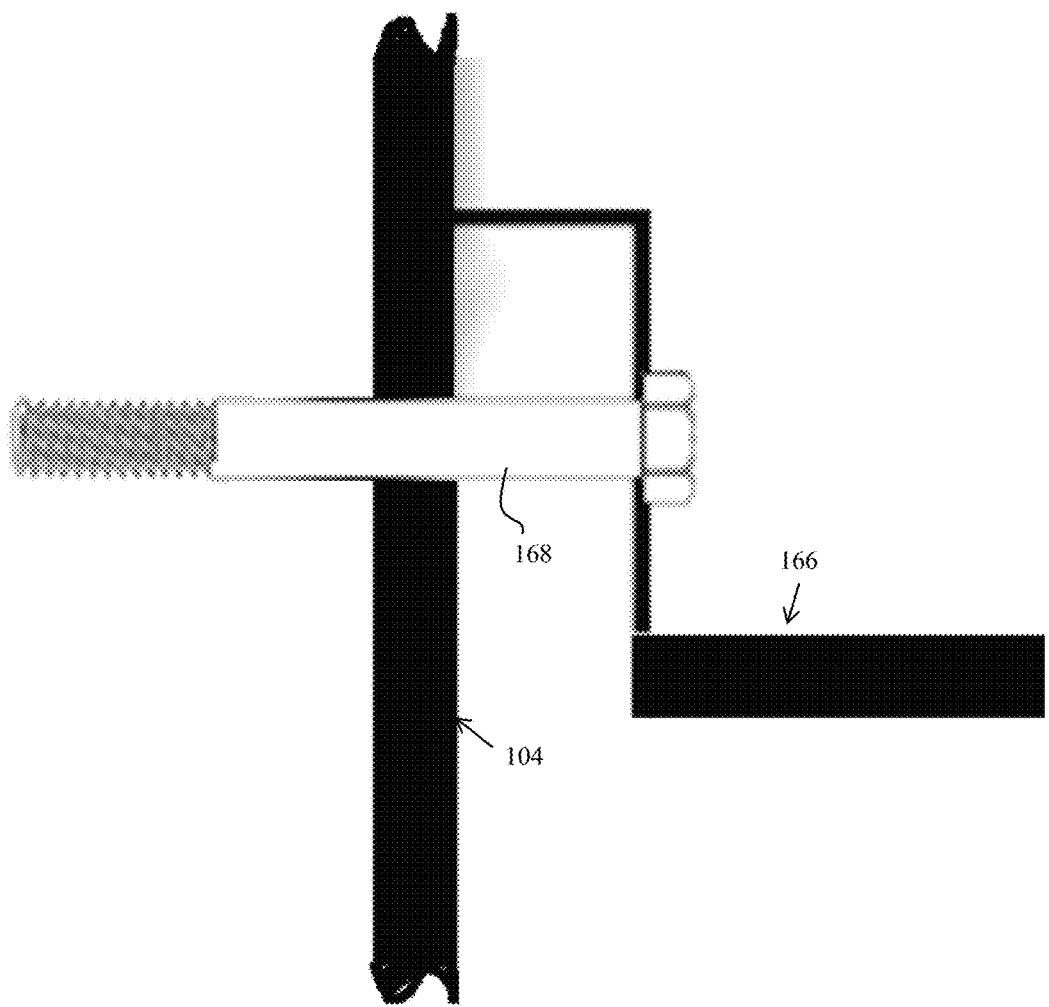
Figure 4D:
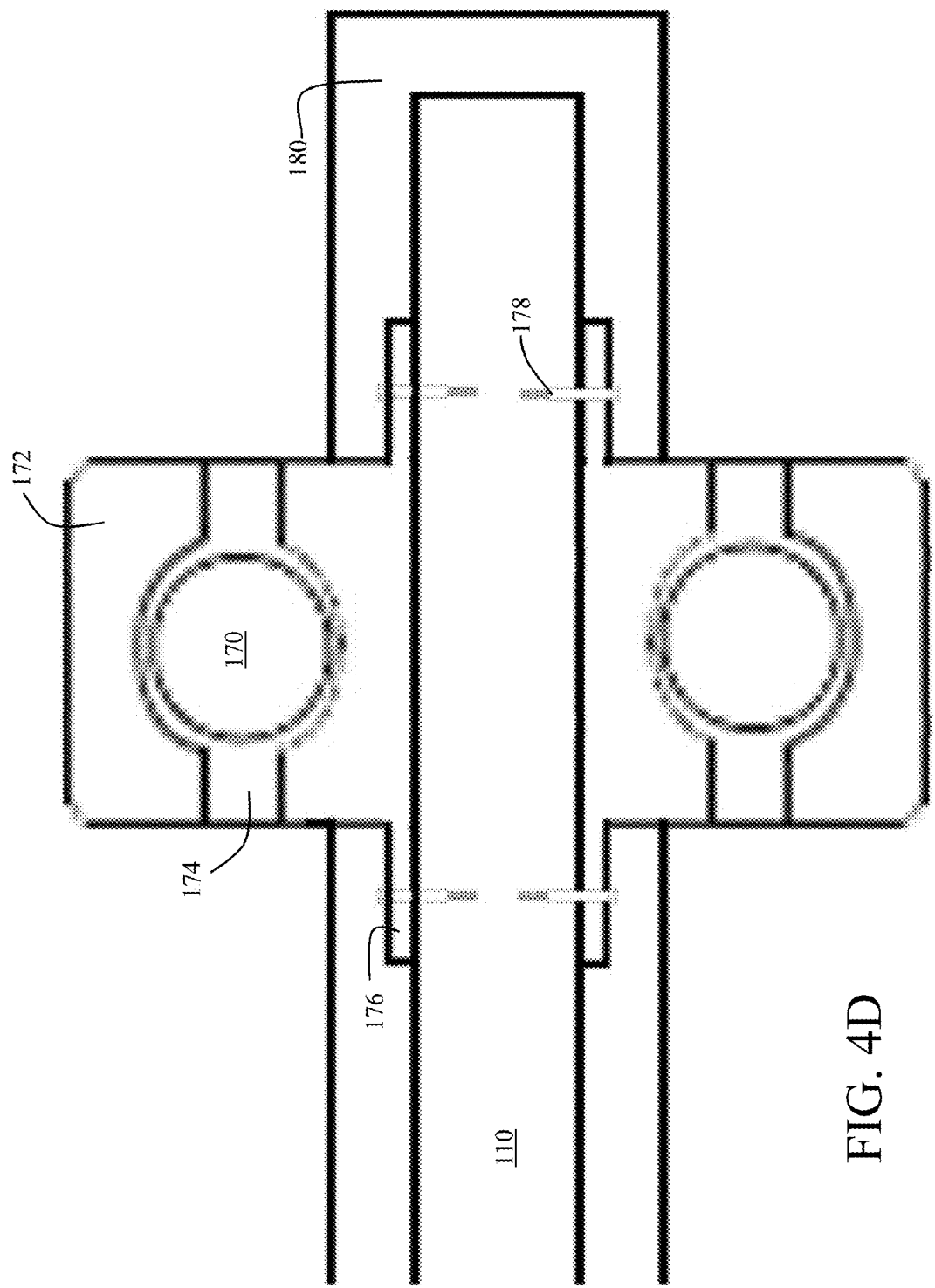
Figure 4E:
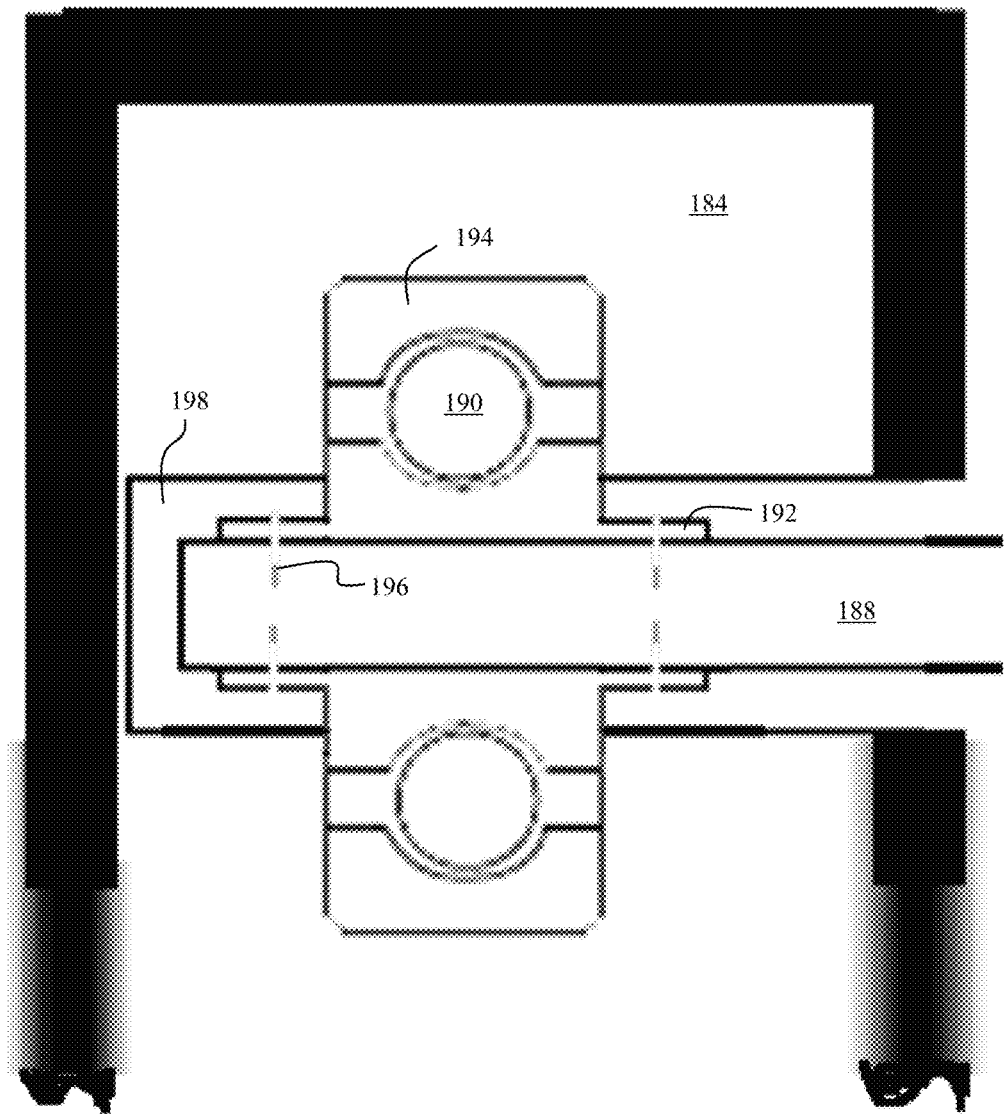

FIGS. 3A and 3B are non-limiting, exemplary illustrations of enlarged views of various aspects of the rim of the wheel and intelligent suspension system of the wheels illustrated in FIGS. 1A to 2C in accordance with one or more embodiments of the present invention. As illustrated, rim 106 is associated with hub 104 by at least three spokes 108. The rim may comprise of metal and may support most conventional types of tires, including solid rubber or plastic tires, well known tube or tubeless inflatable tires, etc. Relative locations of the hub 104 and the rim 106 with respect to one another are varied as spoke lengths 116 change. An axle 110 of the wheel 102 passes into the hub 104. (It should be noted that in FIGS. 1A and 1B, the view is along the axis of the axle, looking at the outer side of the wheel opposite from the axle.)

Rim 106 includes one or more rim couplers 112 that define one or more first pivot points for a first end 114 of the spokes 108. First end 114 of the spokes 108 is comprised of a busing 128 from which extends a threaded pin 130. Rim couplers 112 include rim-support 118 that is secured to inner circumference 120 of the rim 106. Rim-support 118 is comprised of lateral vertical supports 122 and 124 that protrude from a connection base 126, and include a transversely extending bore 128. Connection base 126 of the rim support 118 secures the rim support 118 onto the inner circumference 120 of the rim 106 via a set of fasteners 136. Lateral vertical supports 122 and 124 receive the threaded pin 130. Lateral vertical supports 122 and 124 include an annular ball bearing housing 202 that house ball bearing 134 that receives the threaded pin 130, and include a set of ball bearing flanges 126 for securing the threaded pin 130 to the ball bearing housing 202 by fasteners 132.

A first distance 138 between first end 114 of spoke 108 at the attachment point and inner circumference 122 of rim 106 is fixed and further, location of the first end 114 of spoke 108 along the lateral periphery 140 of the rim 106 is fixed at the attachment point, but an angle $\Omega$ formed between a longitudinal axis 142 of the spoke 108 and a tangent line 144 to the rim 106, in the plane of the wheel 102 at the point of attachment 112, is variable.

It should be noted that the spokes must be able to pivot around their attachment point to the rim in the plane of the wheel. The end of the spoke is cylindrical with two mounting pins. The pins are opposite each other along a spoke diameter and protrude from the end of the spoke to be received by bearings in the bracket. The bracket is comprised of two parallel plates, shaped as shown in FIG. 1A, in the plane of the wheel with a space between them slightly larger than the diameter of the mounting end of the spoke. The inside of each plate has a bearing to receive a pin thus holding the pin in place while allowing it to rotate around the pin's longitudinal axis. It should be noted that pneumatic/hydraulic spokes may be purchased with various mechanisms for mounting. A typical option is to either have pins for mounting or to have bushings to receive pins. The pins are fixed to the cylinder but are mounted in bearings in the bracket to allow free rotation within the plane of the wheel. If the model of off-the-shelf spoke does not come with mounting pins or a bracket with mounting pins it can be inserted into a mounting sleeve that has mounting pins. However, most models come with mounting pins or brackets that allow for rotation. In other words, the spoke is fixed to the rim but can rotate around the axis of the mounting pin. As the hub is displaced from the center of the wheel the spokes need to rotate in this manner as shown in FIG. 1B.

FIGS. 4A to 4E are non-limiting, exemplary illustrations of enlarged views of various aspects of the hub of the wheel and intelligent suspension system of the wheels illustrated in FIGS. 1A to 3B using free axle configuration in accordance with one or more embodiments of the present invention. As illustrated, a hub profile 146 of the hub 104 has a generally triangular configuration, with spokes 108 associated with vertices 148.

The axle can be fixed to the hub so that it can provide translational force to the wheel, i.e. the turning axle can cause the vehicle to move, or the axle be mounted in a bearing in the hub that allows it to turn freely with respect to the wheel, so that it cannot provide motive force to the wheel. The latter arrangement can used in manually powered wheel chairs for examples. The center of hub receives the wheel chair axle that connect the two wheel and supports the weight of the chair. In this embodiment the axle does not rotate, the wheels and their hubs rotate around the axle on bearings in the in the center of the hub. As detailed below, it is also possible to make a small modification to the design so that the axle is fixed to the wheel and rotates within bearings fixed to the wheel chair seat, or load bearing support for a powered vehicle.

Hub 104 includes hub couplers 150 that define one or more second pivot points for a second end 152 of the spokes 108. Hub couplers 150 include hub-supports 182 and 184 that extend vertically from the hub 104. Hub-supports 182 and 184 are lateral vertical flanges that protrude from main hub body 186, and include a transversally extending bore 198. Hub-supports 182 and 184 receive a pivot pin 188. Hub-supports 182 and 184 include ball bearing housing 194 with ball bearings 190 that receive the pivot pin 188, and include a set of ball bearing flanges 192 for securing the pivot pin 188 to the ball bearing housing 194 by fasteners 196. The hub end of the spoke has a mount with two fixed pins, fixed into bushings in the cylinder. The other ends of the pins are bolted to the inner ring ball bearings, the outer non-rotating ring of the bearings are fixed within the hub bracket by epoxy as shown, or by extra flanges and bolts. Hub 104 includes hub opening 154 at the hub center 156, defining bore 180 for receiving the wheel axle 110.

A rotating union and electrical slip ring assembly 158 is coupled with the hub profile 146. The rotating union and electrical slip ring assembly 158 is comprised of a through-opening 160 for receiving wheel axle 110. The rotating union and electrical slip ring assembly 158 also includes an integrated rotary union and electric slip ring stator 162 that is secured to the wheel axle 110 by a first fastener 164. The rotating union and electrical slip ring assembly 158 also includes an integrated rotary union and electric slip ring rotor 166 that is secured to the hub 104 by a second fastener 168.

The hub 104 includes a central bore 180 for receiving axle 110. The hub 104 includes ball bearings 170 housed within an annular housing 172 that enable the hub 104 to freely rotate around the wheel axle 110. The ball bearings 170 are secured within lubricant chamber 174. The annular housing 172 includes a set of flanges 176 that enable the annular housing 172 to be fastened onto the axle 110 by a set of fasteners 178. The center of hub receives the wheel chair axle that connect the two wheels and supports the weight of the chair. In this embodiment the axle does not rotate as the vehicle moves, rather the wheels and their hubs rotate around the axle on bearings in the in the center of the hub. It is also possible to make a small modification to the design so that the axle is fixed to the wheel and rotates within bearings fixed to the wheel chair seat, or load bearing support for a powered vehicle.

Figure 5:
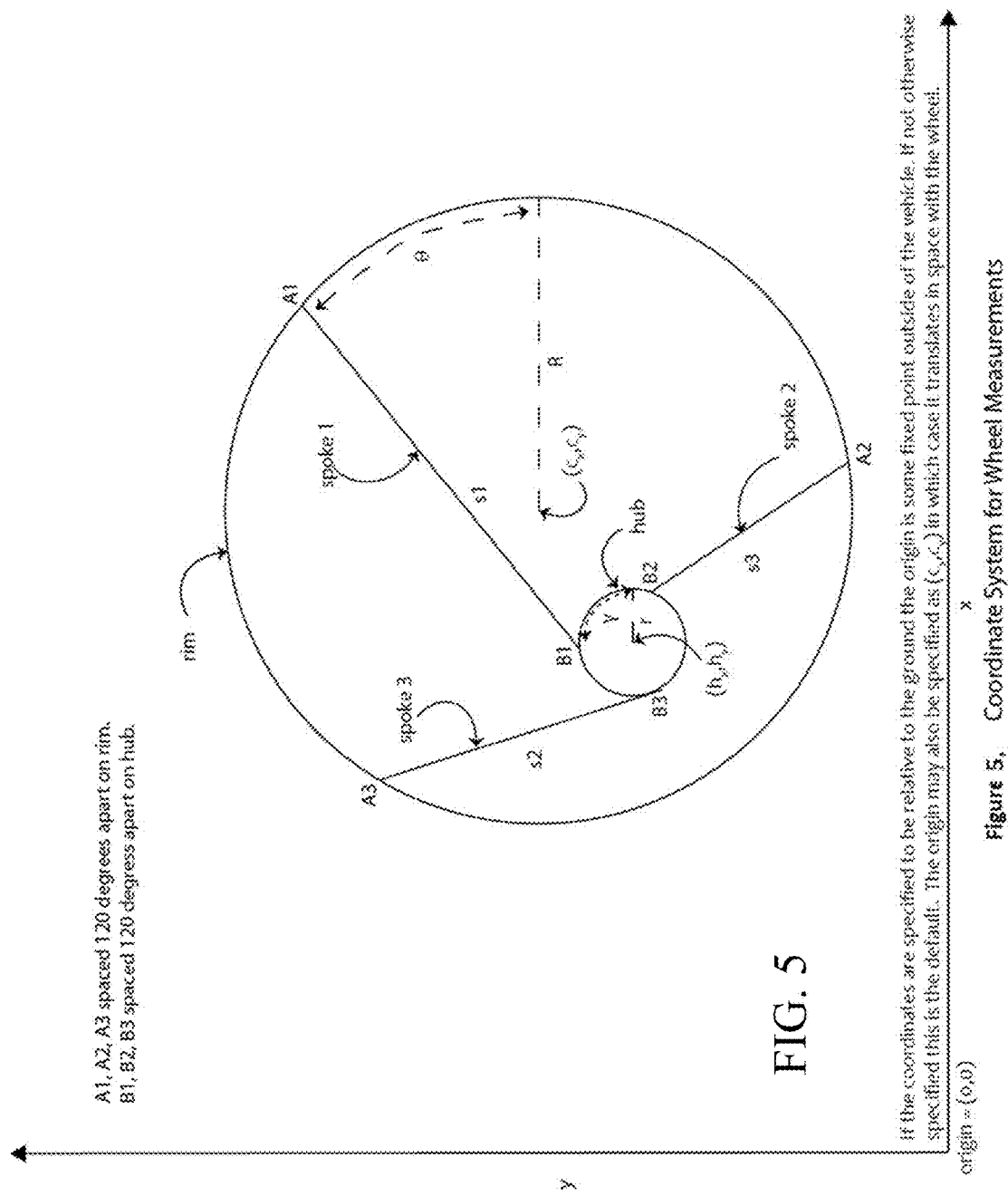
FIG. 5 is a non-limiting, exemplary illustration of a coordinate system used for wheel measurements in accordance with one or more embodiments of the present invention.

FIG. 5 is a non-limiting, exemplary illustration of a coordinate system used for wheel measurements in accordance with one or more embodiments of the present invention. The description of the controlling algorithms/computer programs requires equations describing relations between the locations, positions and orientations of the parts of the wheel. This requires a coordinate system. FIG. 5 defines the coordinate system used to describe the locations and positions of the various wheel parts, in particular the hub and the spokes. It also defines variable names that correspond to locations and orientations of components of the wheel.

In FIG. 5 the rim represents a circle inscribed inside the wheel, in the plane of the wheel, co-incident with the three pivot points where the spokes attach to the rim. The radius 'R' is the inner radius (from the inner circumference of the rim), which is smaller than the radius of the entire wheel that includes the tire. Similarly the parameter 'r' is the radius of the hub measured from the center of the hub to a pivot point on a bracket that connects to a spoke. It is a little smaller than the radius of the entire hub.

The x and y axes (abscissa and ordinate) are shown in FIG. 5 in their usual orientations. Gravity pulls in the −y direction. Angles are measured counterclockwise from the x-axis. The origin of the (x, y) coordinate system is an arbitrary location fixed with respect to the ground, unless it is explicitly specified as the wheel center in which case it moves with the wheel.

The three spokes are labeled 'spoke 1', 'spoke 2' and 'spoke 3'. The angular rotation of the rim is measured as the angle '$\Theta$' between the line parallel to the x-axis running through the wheel center, and a line running from the wheel center to the rim pivot of spoke 1. This means the angle of the wheel is zero when the hub is at the center and the rim pivot of spoke 1 is directly to the right of the wheel center, at the same height above the ground. (Note that spoke 1 will not be horizontal when the wheel rotation angle is zero.)

Similarly the hub rotation angle $\gamma$ is measured as the angle between two lines. One is a line from the hub center parallel to positive x-axis and going to the right of FIG. 5. The other line connects the hub center to the hub pivot of spoke 1. Note that γ will not be zero when the hub is at the center and ⊖ is zero. Aspects of the specific wheel geometry are conveniently captured by the value α which is defined as the value of γ when the hub is in the center of the wheel and ⊖ is zero. The value of α is used in some of the control algorithms. In other words, α defined as 0 for all cases except tangential hubs for which it is 90 degrees.

The variables 's1', 's2' and 's3' are the lengths of the spoke 1, spoke 2, and spoke 3 respectively. Because the spokes are able to change lengths these values are not constant. The point ($c_x$, $c_y$) is the location of the rim center. The location (hx, hy) is the location of the hub center. The points 'A1', 'A2', and 'A3' are the locations of the rim bracket pins for spoke 1, spoke 2, and spoke 3 respectively. They represent pairs of (x, y) coordinates for each point. The points 'B1', 'B2' and 'B3' are the locations of the hub bracket pins for spoke 1, spoke 2, and spoke 3 respectively. They represent pairs of (x, y) coordinates for each point.

The spoke attachment points on the rim are spaced evenly around the rim, and the spoke attachment points are spaced evenly around the hub. Finally the value 'Δt' is a time constant for the system. It is an approximate time for a given program from when it reads in sensor data which it uses to compute new spoke lengths, to when the three spokes attain these new commanded lengths. Δt will depend on the speed of response of the selected spoke components as well as the amount of change in length that is need, and may also depend on the vehicle load. Since the computer can measure the Δt needed for the last command it can continually update its estimate of Δt.

If Δt is ignored, the hub location will not be where it should be now, but where it should have been Δt seconds ago. Depending on how big Δt is it can mean more vibration in "shock absorber" mode, or reduced assistance in going up or down steps. Predicting the future hub motion to be able to cancel it is not necessary for the invention to be useful but greatly increases its utility.

The simplest strategy and the one that is adopted here is to set Δt to the shortest interval allowed between instructions to the spoke controllers, or some small multiple of that time. This parameter is specified by the off-the-shelf component manufacturers. The digital controller is many orders of magnitude faster than this time interval. The shorter this interval is, the more accurately the hub can be positioned as the wheel rotates and is deflected by obstacles. If the spokes do not attain their commanded lengths in this interval of time, that is a device error and must be handled in some way. That is not covered here. The spoke technology and time interval should be chosen large enough so that does not happen for the given vehicle and application.

Note that the angles reported by gyroscopic sensors are in the coordinate system of the sensor module which can be different from that defined here. Either the sensor modules can be mounted to that the zero angle for the axis of interest coincides with that defined here, or the difference can be calibrated and corrected for in the controlling computer. Transformations of the sensor data into the coordinate system of FIG. 5 are not included here as they will be part of the driver software for the sensors that is in between these control algorithms and the hardware.

Listing of Symbols & Definitions the coordinate system is a rectangular coordinate system, defining a Cartesian plane with an origin (0, 0) fixed relative to ground, outside of the wheel as wheel moves;

$c_x$ is the value of the abscissa of center of rim; $c_y$ is the value of the ordinate of the center of the rim;

center of rim ($c_x$, $c_y$) is defined relative to the origin; (It should be noted that ($c_x$, $c_y$) in relation to the rim would always be zero.)

θ is the angular rotation of the rim rim sensor location (RSx, RSy) is defined relative to the origin;

R is inner radius of the rim;

ΔR is defined as the difference between actual position of the rim sensor and R; (e.g., R+ΔR is the distance from the center of the chip sensor to the center of the rim);

hub sensor location ($HS_x$, $HS_y$) is defined relative to the origin;

hub center ($h_x$, $h_y$) is defined relative to the origin;

r is outer radius of the hub;

Δr is defined as the difference between actual position of the hub sensor and r (e.g., r+Δr is the distance from the center of the chip sensor to the center of the hub);

γ is the angular rotation of the hub $t_0$ is current time measured by microcontroller;

Δt is constant time interval from reading of rim sensor data to completion of spoke length changes;

α is 0 for all cases except tangential hubs for which it is 90 degrees.

A1 is the location of the position of first end of the first spoke at rim;

A2 is the location of the position of first end of the second spoke at rim;

A3 is the location of the position of first end of the third spoke at rim;

B1 is the location of the position of second end of the first spoke at hub;

B2 is the location of the position of second end of the second spoke at hub;

B3 is the location of the position of second end of the third spoke at hub;

s1 spoke length for spoke 1 s2 spoke length for spoke 2 s1 spoke length for spoke 3

δt is total adjustment time for a spoke derived from the specs.

notational symbol' after a variable represents a first derivative of that variable with respect to time, and the notational symbol" after a variable represents a second derivative of that variable with respect to time.

FIGS. 6A to 6I are a non-limiting, exemplary illustration of flowcharts that detail controlling and adjusting of spokes lengths in accordance with one or more embodiments of the present invention. It should be noted all routines disclosed may be called by any main program synchronously or asynchronously.

FIG. 6A is a non-limiting, exemplary illustration of a flow diagram that details controlling and adjusting of spokes lengths to maintain the hub at a fixed offset ($\Delta h_x$, $\Delta h_y$) relative to the rim center as the wheel rolls (assuming constant γ=α). As illustrated in FIG. 6A, the goal of this routine is for maintaining location of a hub of a wheel relative to a rim of the wheel at a desired fixed offset location ($\Delta h_x$, $\Delta h_y$) relative to center of rim ($c_x$, $c_y$). That is, the goal is to have $$(\Delta h_x, \Delta h_y) = [(h_x, h_y) - (c_x, c_y)].$$

That is, difference between location of the hub center relative to ground ($h_x$, $h_y$) and rim center relative to ground ($c_x$, $c_y$) will result in some offset location of the hub in relation to the center of the rim. The goal is to have this offset location of the hub equal to the desired fixed offset location ($\Delta h_x$, $\Delta h_y$). Accordingly, ($\Delta h_x$, $\Delta h_y$) may be provided to the routine by users or other external programs, and the calculated resulting number [($h_x$, $h_y$)−($c_x$, $c_y$)] by the control system procedure of FIG. 6A (CSP 6A) should ideally be equal to the goal constant ($\Delta h_x$, $\Delta h_y$).

At first, MCU receives rim sensor location coordinates ($RS_x$, $RS_y$) and rim angular rotation θ from a rim sensor that is located on the rim while maintaining track of current time $t_0$ to determine if Δt time has been reached. Next, MCU determines center of rim ($c_x$, $c_y$) location in accordance with:

$c_x = RS_x − (R+\Delta R)\cos(\theta)$ $c_y = RS_y − (R+\Delta R)\sin(\theta)$.

MCU also receives hub sensor location coordinates ($HS_x$, $HS_y$) and hub angular rotation γ from a hub sensor, and determines hub center ($h_x$, $h_y$) location in accordance with:

$h_x = HS_x − (r+\Delta r)\cos(\gamma)$ $h_y = HS_y − (r+\Delta r)\sin(\gamma)$.

MCU further determines approximate predicted updated values after Δt for constant acceleration in accordance with:

$\theta \leftarrow \theta + \theta' \Delta t + \frac{1}{2}\theta'' \Delta t^2$ $c_x \leftarrow c_x + c_x' \Delta t + \frac{1}{2} c_x'' \Delta t^2$ $c_y \leftarrow c_y + c_y' \Delta t + \frac{1}{2} c_y'' \Delta t^2$ $\theta' \leftarrow \theta' + \theta'' \Delta t$ $c_x' \leftarrow c_x' + c_x'' \Delta t$ $c_y' \leftarrow c_y' + c_y'' \Delta t''$ Variables with symbol ' represent the rate of change of the variable. For example, θ' is the rate of change of angle of rotation of rim. Predicted updated values provide precise values where hub and rim will be located at the end of Δt time interval. Predictive values are needed for a more precise positioning of the hub in a desired location, which is the desired offset location relative to the hub. That is, since the wheel is in constant acceleration and moves and sensory data from hub and rim is read only after every Δt time intervals, the exact location of the hub, rim and the wheel would not be known within or during the Δt time interval. In other words, during Δt time interval there is a "blind spot" where the wheel continues to accelerate and be moved, but no sensory data is provided with respect to wheel location and hence, where the hub and rim will be after Δt time interval (and before sensory reading) is not known. The current known location of the hub and rim is known base on the last sensory input, but the location of the hub and rim is not know during and after the Δt time interval. Accordingly, predictive values derived provide a prediction with respect to the hub and rim locations at the end of the Δt time interval before reading of the next sensory data (for the Δt time interval that the wheel has moved).

The wheel moves and has a constant acceleration before, during, and after Δt time interval. However, sensory data is input only after Δt time interval. Therefore, there is a sensory data "blind spot" within or during Δt time interval where the hub and rim locations have changed due to constant acceleration of the wheel, but are not known. With the predictive values, the desired offset location of hub is predicatively anticipated based on the constant acceleration of the wheel (within or during Δt time interval). This way, the hub motion does not "play catch-up" with the motion of the wheel, which is only revealed by sensory data after Δt time interval. In other words, predictive values eliminate high frequency jitter as the hub "catches up" with the motion of the rim without using the predictive values.

It should be noted that constant acceleration is assumed for convenience of calculation and should not be limiting. For example, the above Newtonian equations may be easily expressed or cast as Taylor series of equations if using varying acceleration. The above are well known Newton's equations of motion for constant acceleration is part of a more general Taylor series using higher order derivatives of distance with respect to time. Also using less terms and ignoring the acceleration terms in these equations may work well enough under certain conditions and for certain purposes.

Reason for using a constant α for the desired γ is simplification of calculations. That is, a predictive value for hub angular rotation γ would not be required and an allowed value for γ is assured. In FIG. 6A and FIG. 6D γ is set to 0 or 90 depending on the type of hub, but it can be set to another safe value depending on the exact wheel geometry. It should be noted that knowing the lengths of the three spokes is sufficient to completely determine the displacement of the hub and its angle of rotation γ, regardless of whether hub angular rotation γ is calculated and used or α is used instead. Accordingly, α is used as the value of hub angular rotation γ for simplicity of calculations and equations.

It should be noted that there is more than one set of spoke lengths that provide the correct displacement for the hub relative to the rim center since hub has both rotational and translational motion. For example, the hub may be displaced to a location, but the lengths of each spoke connected to the hub may be varied at that particular location of the hub even if the hub itself has no translational motion, but instead, is rotated at that position. In other words, since hub has both rotational and translational motion, the hub may translate to a specific location within the rim relative to rim center but once relocated, if hub rotates (twists in its place with the spokes connected), the spoke lengths would have to change, even with hub having zero translational motion. Accordingly, determining the current spoke lengths from the position of the hub requires knowing the value for γ, or choosing γ first to get desired spoke lengths.

MCU further determines the needed spoke lengths S1, S2, and S3 to determine hub displacement in accordance with:

$A1 = (R\cos(\Theta), R\sin(\Theta))$ $A2 = (R\cos(\Theta+120), R\sin(\Theta+120))$ $A3 = (R\cos(\Theta+240), R\sin(\Theta+240))$ $B1 = (r\cos(\alpha+\Theta), r\sin(\alpha+\Theta)) + (\Delta h_x + c_x, \Delta h_y + c_y)$ $B2 = (r\cos(\alpha+\Theta+120), r\sin(\alpha+\Theta+120)) + (\Delta h_x + c_x, \Delta h_y + c_y)$ $B3 = (r\cos(\alpha+\Theta+240), r\sin(\alpha+\Theta+240)) + (\Delta h_x + c_x, \Delta h_y + c_y)$ $S1 = \|A1 − B1\|$ $S2 = \|A2 − B2\|$ $S3 = \|A3 − B3\|$ MCU also determines if S1, S2, and S3 are within range of possible values prior to transmitting change length command signal. It should be noted that if a spoke accept velocity control (how fast they change lengths), MCU transmits adjustment commands to spokes for spoke lengths S1, S2, and S3 by time $t_0+\Delta t$ (or at desired speed). In other words, reconciliation process is needed to correct (if needed) time $t_0+\Delta t$ and the time it takes for the change of spoke length to complete.

The speed by which a spoke changes length must be reconciled with the amount of time $t_0+\Delta t$ for the actual change to take place. For example, if adjustment time for the spokes is too fast, they will reach their respective span (extension or contraction) too soon, prior to $\Delta t$, which would introduce error in the hub location. That is, instead of the hub being located to a desired offset at the specified time $\Delta t$, the hub would be displaced too soon to that location due to the higher speed by which spokes change lengths. Accordingly, with the length data S1, S2, and S3, the speed by which spoke lengths are changed are also control so that the spokes reach the desired lengths in accordance with the length data within $t_0+\Delta t$, not sooner or later. Controlling the speed of adjustment so that the adjustments are completed at $\Delta t$, not sooner or later because the predictions are based on $\Delta t$.

On the other hand, if the spokes do not accept velocity control, estimate time $\delta t$ required for each spoke to reach the desired length, and transmit instructions at time $t_0+\Delta t-\delta t$. Some spokes move only at some rate (or speed), and cannot be controlled to be slower or faster. The spec of the spoke provides the rate or speed of change of lengths for spokes and in some cases, the time it takes for the total adjustment and hence, estimate time $\delta t$ may be derived from the specs. Once determined, estimate time $\delta t$ may be used to change the time $t_0+\Delta t$ at which command signals are transmitted to the spokes by $\delta t$ so that the next time is still $t_0+\Delta t$. For example, if the spoke change lengths at 3 seconds and $t_0+\Delta t$ is 6 seconds, we wait three seconds ($\delta t$) before we send out the instructions. Spoke lengths are finally changed according to instructions (length/time).

It should be noted that rim sensor data is not read again until after $\Delta t$ time. $\Delta t$ time is of sufficient duration to ensure that spoke length changes are completed prior to reading of next rim sensor data. That is, there is no "checking" to determine if the spoke lengths have completed their change within the $\Delta t$ time. For example, even if the spoke lengths are varied faster, no rim data is read until after the constant $\Delta t$ time. It should be noted that $\Delta t$ time may be optimized by well known processes where for example, determination may be made if spoke lengths have changed prior to end of $\Delta t$ time in which case, $\Delta t$ time may be shortened for next processing. This may be accomplished by a variety of mechanism a non-limiting example of which may include use of sensors to determine if spoke lengths have reached the desired span prior to end $\Delta t$ time interval. In general, $\Delta t$ time depends on the capabilities of the spoke (how fast it can be extended or contracted). The critical aspect of $\Delta t$ is that the majority of the $\Delta t$ time interval (the largest part of the time—about 99%) is delay related to the physical adjustment of the spoke lengths. That is, how long it takes for the spoke to start and end its adjustment of its length.

FIG. 6B is a non-limiting, exemplary illustration of a flow diagram that details controlling and adjusting of spokes lengths to maintain the hub at a fixed offset $(\Delta h_x, \Delta h_y)$ relative to the rim center as the wheel rolls (using a predicted $\gamma$). The operations illustrated in FIG. 6B includes and requires similar corresponding or equivalent components, interconnections, functional, operational, and or cooperative relationships as the operations illustrated in FIG. 6A, and described above. Therefore, for the sake of brevity, clarity, convenience, and to avoid duplication, the general description of FIG. 6B will not repeat every corresponding or equivalent component, interconnections, functional, operational, and or cooperative relationships that has already been described above in relation to operations shown in FIG. 6A.

As illustrated in FIG. 6B, the operations determine approximate predicted updated values after $\Delta t$ for constant acceleration in accordance with the following, which includes the predicted $\gamma$:

$$\theta \leftarrow \theta + \theta' \Delta t + \tfrac{1}{2}\theta'' \Delta t^2$$

$$c_x \leftarrow c_x + c_x' \Delta t + \tfrac{1}{2}c_x'' \Delta t^2$$

$$c_y \leftarrow c_y + c_y' \Delta t + \tfrac{1}{2}c_y'' \Delta t^2$$

$$\theta' \leftarrow \theta' + \theta'' \Delta t$$

$$c_x' \leftarrow c_x' + c_x'' \Delta t$$

$$c_y' \leftarrow c_y' + cy'' \Delta t''$$

$$\gamma \leftarrow \gamma + \gamma' \Delta t + \tfrac{1}{2}\gamma'' \Delta t^2$$

It should be noted that there is more than one set of spoke lengths that provide the correct displacement for the hub relative to the rim center since hub has both rotational and translational motion. For example, the hub may be displaced to a location, but the lengths of each spoke connected to the hub may be varied at that particular location of the hub even if the hub itself has no translational motion, but instead, is rotated at that position. In other words, since hub has both rotational and translational motion (which may or may not occur contemporaneously), the hub may translate to a specific location within the rim relative to rim center but once relocated, if hub rotates (twists in its place with the spokes connected), the spoke lengths would have to change, even with hub having zero translational motion. Accordingly, instead of using a constant $\alpha$, the hub angular rotation $\gamma$ may be used as a variable to minimize adjustment travel distance needed for each spoke length while still placing the hub at desired offset location relative to rim center. For example, if spoke length S1 for spoke one is to move X distance to displace the hub, the angular rotation $\gamma$ of the hub may be used to predict and rotate the hub so that the hub is still moved to the same location, but with less travel Y, where (Y<X) due to twist or rotation of the hub to shorten the spoke length S1. It should be noted that since the spoke length S1 requires a shorter travel due to consideration of predicted $\gamma$, then the change would be accomplished sooner due to shorter travel distance. The faster rate of change is beneficial in that $\delta t$ may be made smaller for a more precise positioning.

FIGS. 6C-1 and 6C-2 are non-limiting, exemplary illustrations of a flow diagram that details controlling and adjusting of spokes lengths to maintain the hub at a fixed offset $(\Delta h_x, \Delta h_y)$ relative to the rim center as the wheel rolls (using optimized $\gamma$). The operations illustrated in FIGS. 6C-1 and 6C-2 includes and requires similar corresponding or equivalent components, interconnections, functional, operational, and or cooperative relationships as the operations illustrated in FIGS. 6A and 6B, and described above. Therefore, for the sake of brevity, clarity, convenience, and to avoid duplication, the general description of FIGS. 6C-1 and 6C-2 will not repeat every corresponding or equivalent component, interconnections, functional, operational, and or cooperative relationships that has already been described above in relation to operations shown in FIGS. 6A and 6B.

As illustrated in FIGS. 6C-1 and 6C-2, the operations by the MCU determine current spoke lengths $S1_0$, $S2_0$, and $S3_0$ and current hub angular rotation $\gamma_0$ in accordance with:

$$A1 = (R\cos(\Theta), R\sin(\Theta))$$

$$A2 = (R\cos(\Theta+120), R\sin(\Theta+120))$$

$$A3 = (R\cos(\Theta+240), R\sin(\Theta+240))$$

$$B1 = (r\cos(\gamma), r\sin(\gamma)) + (\Delta h_x + c_x, \Delta h_y + c_y)$$

$$B2 = (r\cos(\gamma+120), r\sin(\gamma+120)) + (\Delta h_x + c_x, \Delta h_y + c_y)$$

$$B3 = (r\cos(\gamma+240), r\sin(\gamma+240)) + (\Delta h_x + c_x, \Delta h_y + c_y)$$

$$S1_0 = \|A1 - B1\|$$

$$S2_0 = \|A2 - B2\|$$

$$S3_0 = \|A3 - B3\|$$

$$\gamma_0 = \gamma.$$

After determining approximate predicted updated values after $\Delta t$ for constant acceleration, MCU determines optimal $\gamma$ for minimal spoke length changes:

$$|S1 - S1_0|,$$

$$|S2 - S2_0|, \text{ and}$$

$$|S3 - S3_0|;$$

This operation provides the most optimum value of $\gamma$ needed to minimizes the change of the lengths of the spokes for the same hub location. Using the current values to obtain the minimum change required in terms of spoke lengths for hub displacement. The less they move the faster the operation since they have to move less, it takes them less time to obtain desired lengths. In other words, maximum length adjustment is minimized using the most optimum $\gamma$.

The optimal $\gamma$ for the minimum spoke length for maximum displacement of the hub may be considered constrained non-linear "minimax solution" that may be solved using common class of iterative solutions such as using a very well known iterative quasi-Newton method, wherein the method may include the equations shown in FIGS. 6C-1 and 6C-2. Note numerical approximations to first and second derivatives may be used in the quasi-Newton method, where the results quickly converge for the optimal $\gamma$ that would result in minimum spoke length changes.

FIGS. 6D to 6F-2 procedures are analogous to those of respective FIGS. 6A to 6C-2 with the difference in that instead of seeking to reach or maintain a fixed value of $(\Delta h_x, \Delta h_y)$ relative to the center of the rim $(c_x, c_y)$, the procedures seek to reach or maintain a fixed value of $(\Delta h_x, h_{y0})$, which is that the height of the hub above the ground is fixed and not the height of the hub relative to the wheel rim's center at $c_y$. Therefore the goal is:

$$(\Delta h_x + c_x, h_{y0}) = [(h_x, h_y) - (c_x, 0)]$$

Other than the above, the three control procedures detailed in FIGS. 6D to 6F-2 are analogous to the three discussed above for FIGS. 6A to 6C-2. Note that these control procedures if run continuously will function as vertical shock absorbers, since they will work to cancel out any vertical motions of the hub.

Figure 6G:
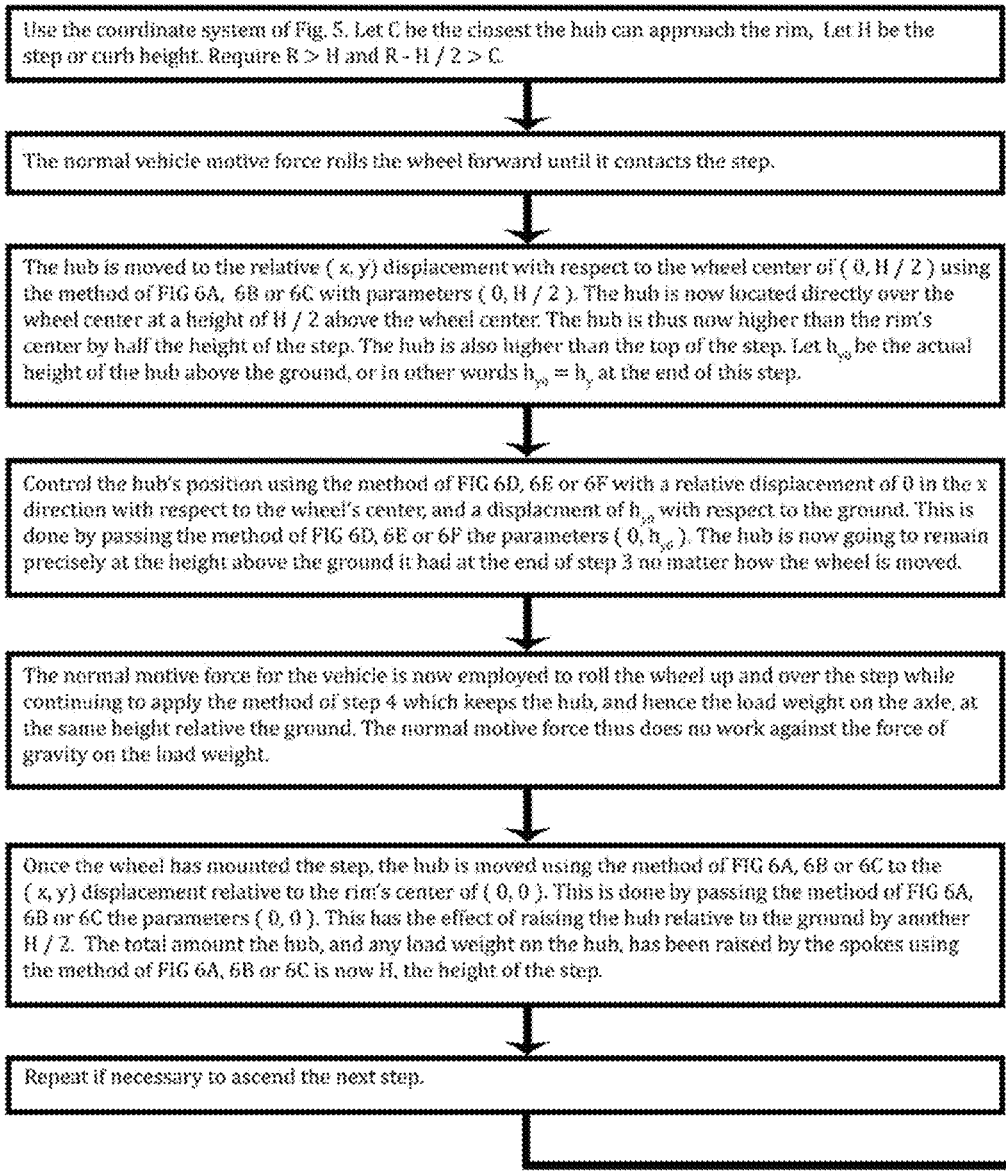

FIG. 6G is a non-limiting, exemplary illustration of a flow diagram that details controlling and adjusting of spokes lengths to negotiate over a set of steps, a curb or other vertical obstacles in accordance with one or more embodiments of the present invention.

One of the most important and complex functions of the wheel is to negotiate steps or curbs. In this application the motors driving the spokes actually do the lifting or control the dropping of the load weight of the vehicle when going up or down a step, so that it does not take more effort than going over a level path.

Increasing $h_y$ so that the distance of the hub is above the wheel center lifts the vehicle load weight (the passenger for a wheel chair). This is the same work the person in the chair, or pushing the chair, would have to do in going up a step. The work, or energy output, is computed as the force times the distance, in this case the weight of the person times the height of the step. Therefore, $$h_y = R + H$$

Where R is the radius of the rim and H is the height of the step. Accordingly, $h_y = R + H$ is the height of the wheel center after mounting the step (assuming the hub center was moved to the rim center). The load is lifted as much as if the chair had mounted the step. Now as the person pushes the chair over the step, $h_y$ is now held fixed at its absolute height above the ground so that, after mounting the step, the hub is now located back at the rim center. The person pushing the chair does no work against gravity. That work is done by the spoke motor or pump as the case may be. At this point, the wheel is ready to negotiate the next step if there is one.

Note that this procedure makes it easy to go up and down stairs by doing the work against gravity. It does not balance the chair as it goes down or up the steps. The person in the chair or pushing the chair has to be skilled at maintaining the chair balanced, or other known devices may be used to facilitate the balance for the wheel chair going up or down stairs. One example of such a device is where the front two small wheels of the chair are actually each a cluster of three small wheels arranged parallel to each other, around the location of the conventional front wheel's center, with the three centers of each small wheel forming an equilateral triangle in the plane of the conventional front wheel. The three small wheels are free to rotate both around their own center and around the location that would be center of the conventional front wheel. Nonetheless, such devices may also be used on the chair to aid in balance when negotiating steps and curbs if needed.

Figure 6H:
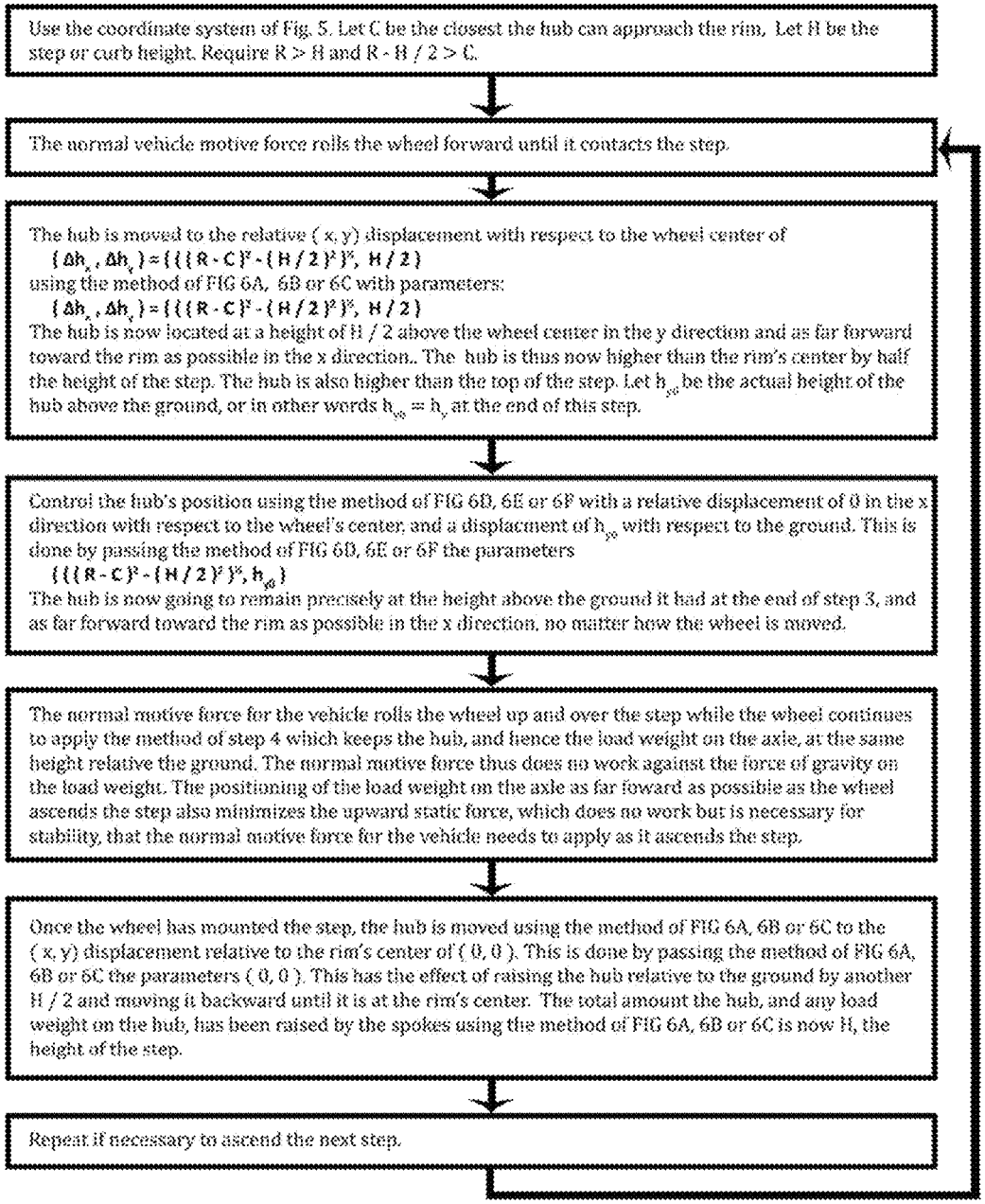

FIG. 6H is a non-limiting, exemplary illustration of a flow diagram that details controlling and adjusting of spokes lengths to negotiate over a set of steps, a curb or other vertical obstacles with static force (torque) reduction in accordance with one or more embodiments of the present invention. The addition of static force reduction may be accomplished by adding horizontal motion of the hub relative the wheel center to move the hub to as close to the rise of the step (curb, or other vertical obstacle) as possible.

Figure 6I:
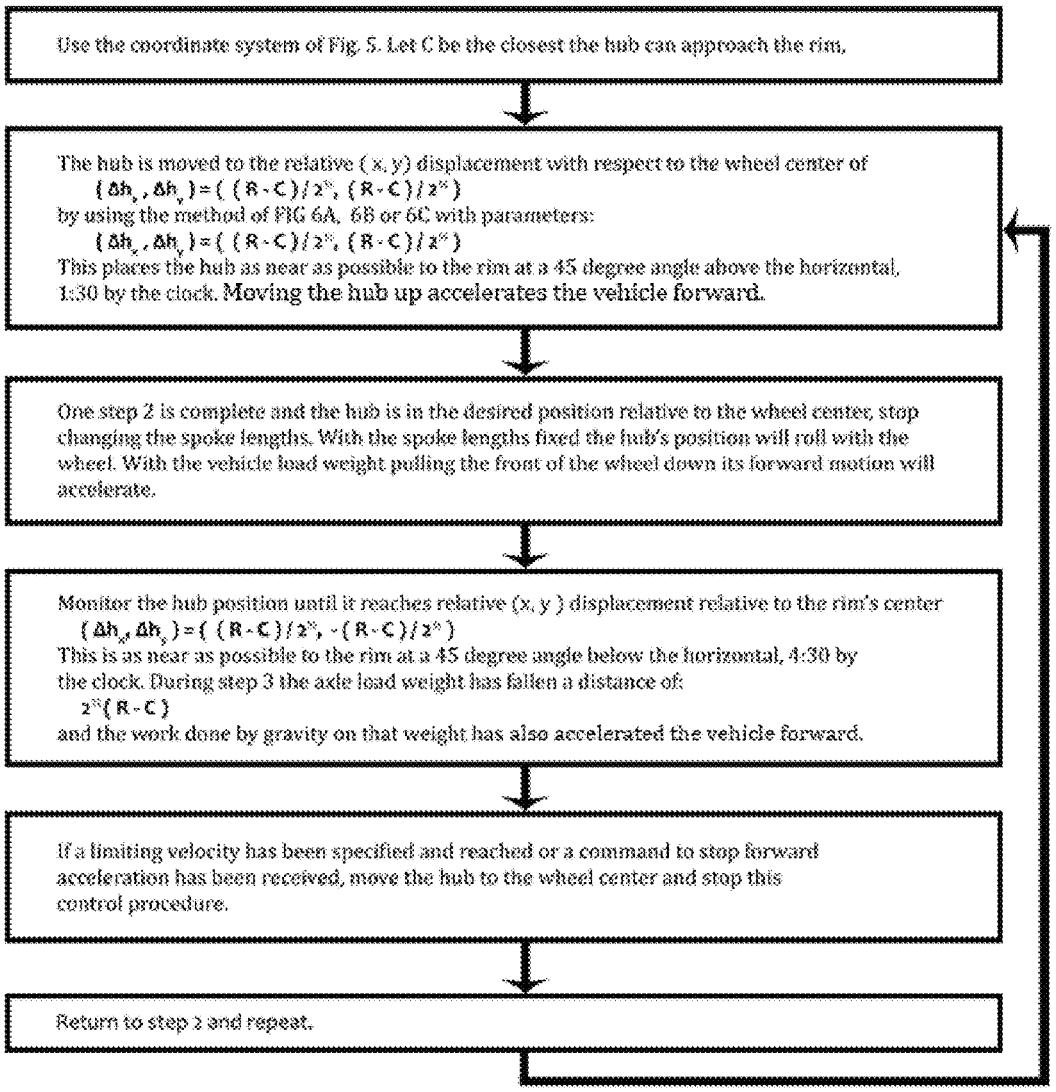
Figure 7A:
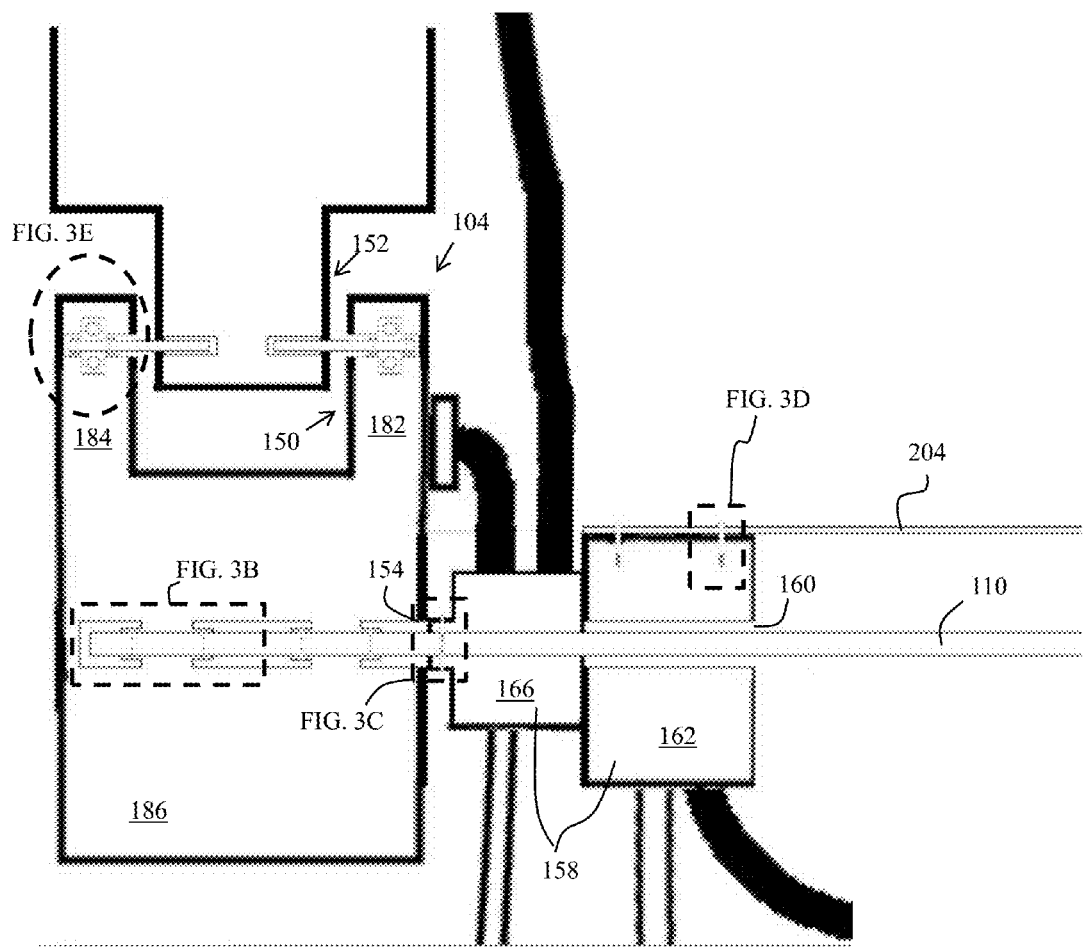
FIGS. 7A to 7D are non-limiting, exemplary illustrations of enlarged views of various aspects of the hub of the wheel and intelligent suspension system of the wheels illustrated in FIGS. 1A to 6I, but using a hub driving axle configuration in accordance with one or more embodiments of the present invention.
Figure 7B:
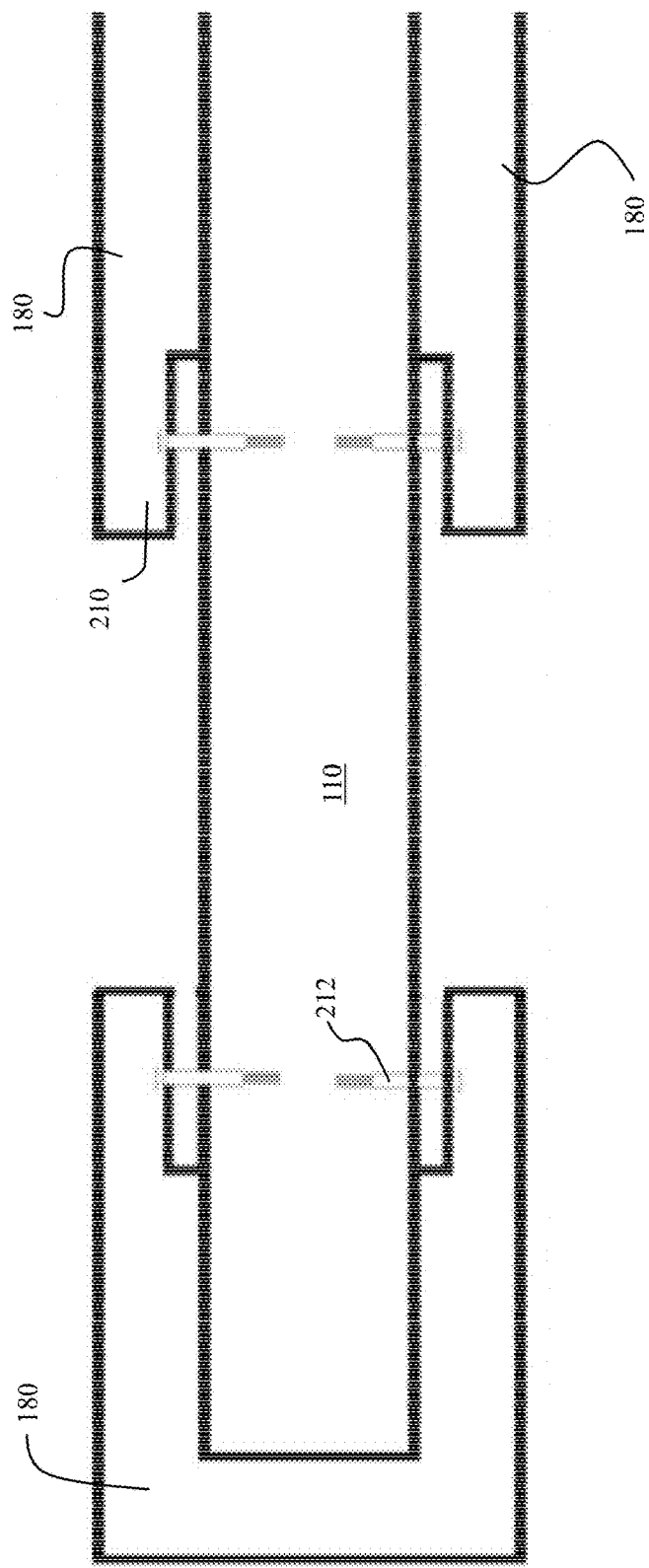
Figure 7C:
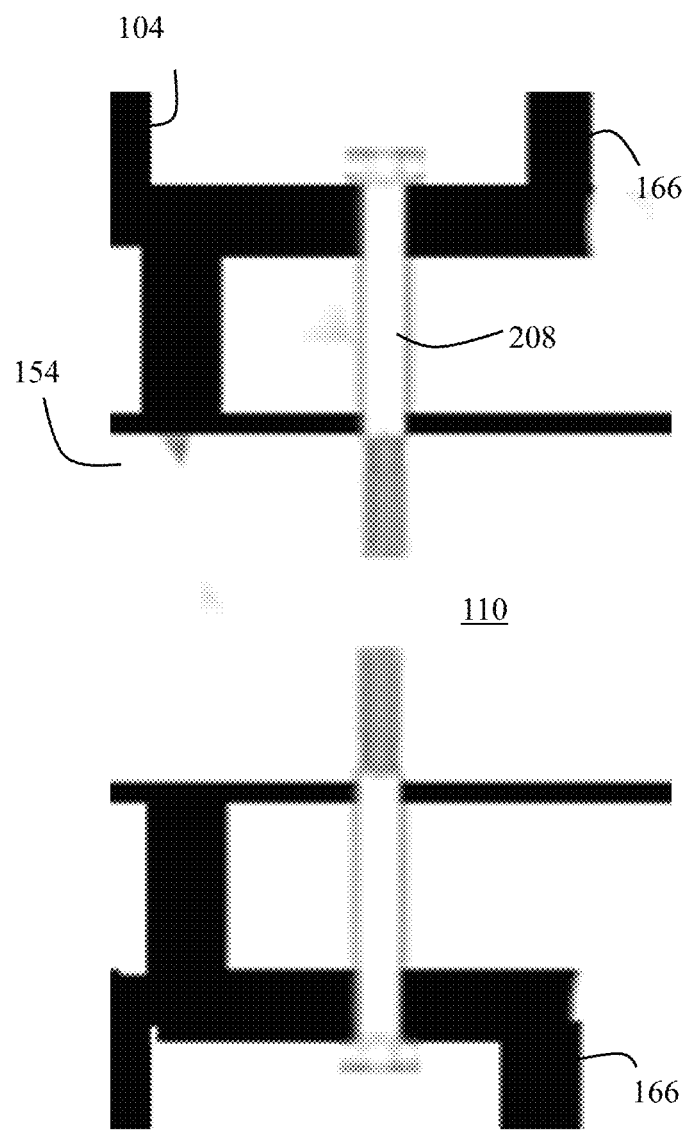
Figure 7D:
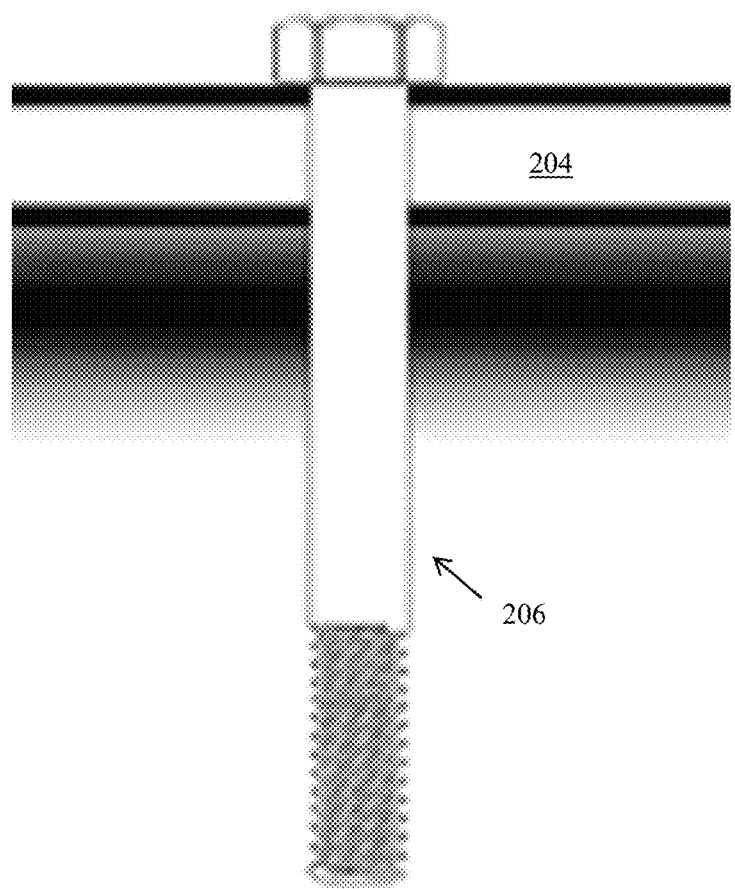

FIG. 6I is a non-limiting, exemplary illustration of a flow diagram that details controlling and adjusting of spokes lengths to propel the vehicle in accordance with one or more embodiments of the present invention. By moving the hub forward toward the front of the wheel (at 1:30 by the clock), gravity pulling down on the load will also roll wheel forward by the hub being pushed down (to about 4:30 by the clock). Procedure of FIG. 6I enables cyclical movement of the hub forward to 1:30 by the clock, by allowing gravity pull hub down to about 4:30 by the clock thus moving the vehicle forward, and then lift the hub back up and forward to 1:30 by the clock again once it reaches the bottom of the wheel.

The spokes may pump more energy into the forward motion with each revolution of the wheel, in the manner a person puts a swing into motion.

It should be noted that the value of 45 degrees was selected as a reasonable optimum to obtain the greatest acceleration from one cycle of the procedure, but the exact angle that is optimum will depend on the vehicle load weight and the internal and external friction forces. The smaller the angle chosen the smoother the acceleration and the less the load will be moved up and down. The angle may be easily fixed to the optimum for the relevant situation or it may be sent to this procedure as a parameter. The same procedure could be used, moving the hub back rather than forward, to move the vehicle backwards. This could be useful sometimes for example in a wheel chair for emergency mobility.

Using very small angles instead of + or −45 degrees provides an efficient and practical way to propel the vehicle forward or backward using this invention alone without a conventional motor. The closer α and β are to 0 the faster the acceleration and the less the axle load is moved up and down, for a smoother ride, but the faster the spokes have to be able to change lengths for this procedure to work.

If the + and −angle of FIG. 6I is reduced far enough, the time the hub is falling in step 3 can be smaller than Δt in FIG. 6A. In that case the predictive algorithm of FIG. 6A can cancel out the falling motion by lifting the hub simultaneously as it falls. Now steps 3 and 4 of FIG. 6I are not needed and the hub stays at the same height. The spokes pushing up in step 2 still create a reactive force pushing the front of the rim down and accelerating the vehicle forward as they did before, but the hub never rolls down with the wheel. Thus the load is not moved up and down and the forward acceleration is constant. The spokes have to be able to change length rapidly for this to work.

It is also possible to increase the value of C in FIG. 6I which brings the hub closer to the center of the rim. This proportionally decreases the acceleration and provides a convenient and accurate way to control the amount of acceleration. When C=R the acceleration is zero.

This provides an efficient and practical way to propel the vehicle forward or backward using this invention alone without a conventional motor.

On the other hand increasing the value of the angle from 45 degrees to 90 degrees and moving the hub up in step 2 along a vertical line, while causing the vehicle load weight to move up and down a lot and generating bursts of acceleration, will work to accelerate the vehicle even for spokes that cannot change length very fast.

Using this in combination with procedures of FIG. 6H will help propel the vehicle up and over the step or curb. Once the hub is located forward of the pivot point between the rim and the nose (or edge or the upper tread), the spoke lengths can be held fixed so the load weight will help to pull the wheel up and over the nose. In this case and if the wheel and step geometry permits the hub can be initially raised higher than R+H/2 in order to get more forward assist from gravity.

FIGS. 7A to 7D are non-limiting, exemplary illustrations of enlarged views of various aspects of the hub of the wheel and intelligent suspension system of the wheels illustrated in FIGS. 1A to 6I, but using a hub driving axle configuration in accordance with one or more embodiments of the present invention. The hub arrangement illustrated in FIGS. 7A to 7D includes similar corresponding or equivalent components, interconnections, functional, operational, and or cooperative relationships as the hub that is shown in FIGS. 1A to 6I, and described above. Therefore, for the sake of brevity, clarity, convenience, and to avoid duplication, the general description of FIGS. 7A to 7D will not repeat every corresponding or equivalent component, interconnections, functional, operational, and or cooperative relationships that has already been described above in relation to the hub that is shown in FIGS. 1A to 6I.

As illustrated in FIGS. 7A to 7D, the hub 104 includes hub opening 154 at the hub center 156, defining bore 180 for receiving the wheel axle 110. A rotating union and electrical slip ring assembly 158 is coupled with the hub profile 146. The rotating union and electrical slip ring assembly 158 is comprised of a through-opening 160 for receiving wheel axle 110. Further included is an integrated rotary union and electric slip ring stator 162 that is secured to a stator brace 204, which is fixed to vehicle frame by a first fastener 206. Additionally included is an integrated rotary union and electric slip ring rotor 166 that is secured to the axle 110 by one or more fastener 208. The hub 104 includes a central bore 180 for receiving axle 110. The bore 180 includes flanges 210 that enable hub 104 to be secured to axle 110 via a set of fasteners 212.

FIGS. 8A to 8D are non-limiting, exemplary illustrations of a wheels with intelligent suspension system that use a three stage telescoping linear electric motor in accordance with one or more embodiments of the present invention. The wheel and intelligent suspension system illustrated in FIGS. 8A to 8D includes similar corresponding or equivalent components, interconnections, functional, operational, and or cooperative relationships as the wheel and intelligent suspension systems that are shown in FIGS. 1A to 7D, and described above. Therefore, for the sake of brevity, clarity, convenience, and to avoid duplication, the general description of FIGS. 8A to 8D will not repeat every corresponding or equivalent component, interconnections, functional, operational, and or cooperative relationships that has already been described above in relation to wheel and intelligent suspension systems that are shown in FIGS. 1A to 7D.

Figure 8A:
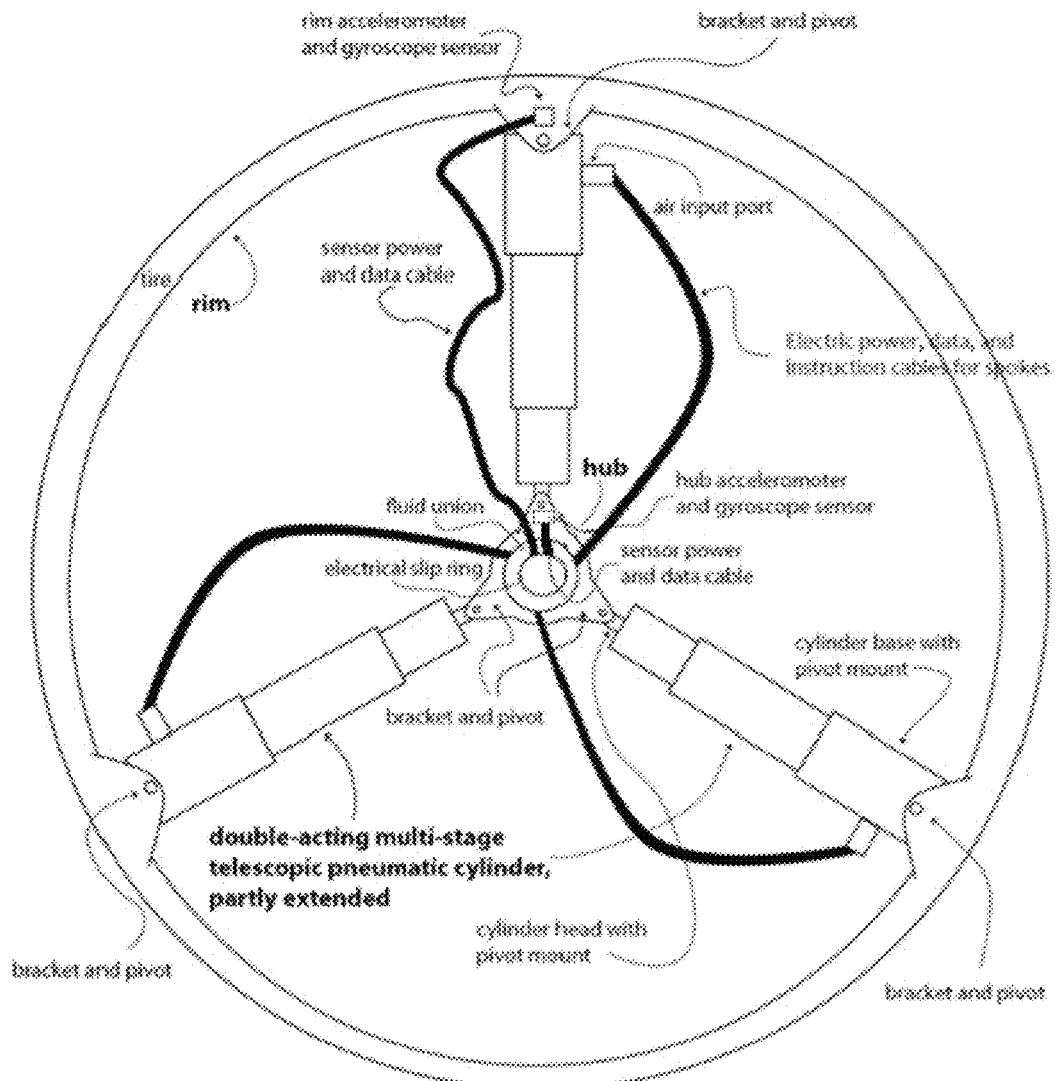
FIGS. 8A to 8D are non-limiting, exemplary illustrations of a wheels with intelligent suspension system that use a three stage telescoping linear electric motor in accordance with one or more embodiments of the present invention.
Figure 8B:
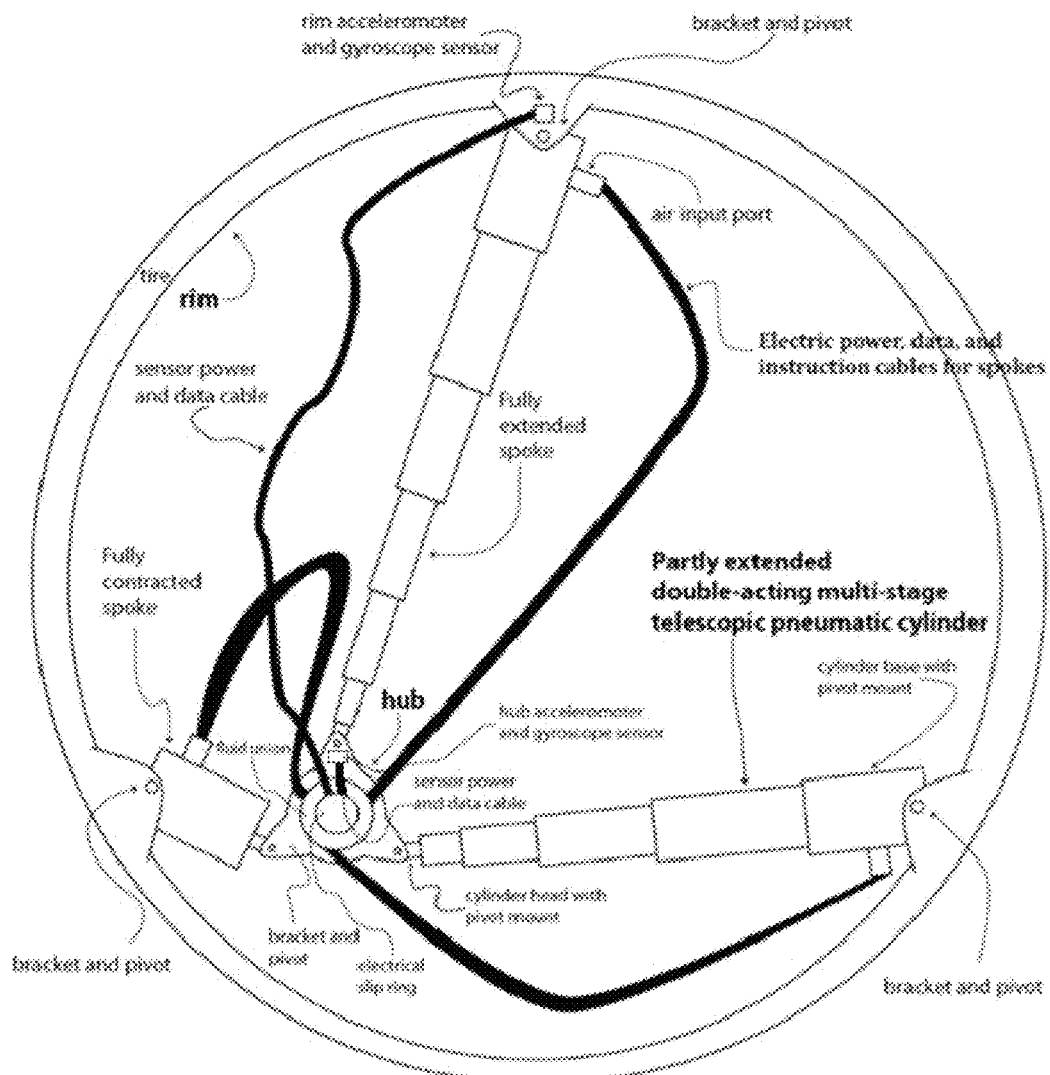
Figure 8C:
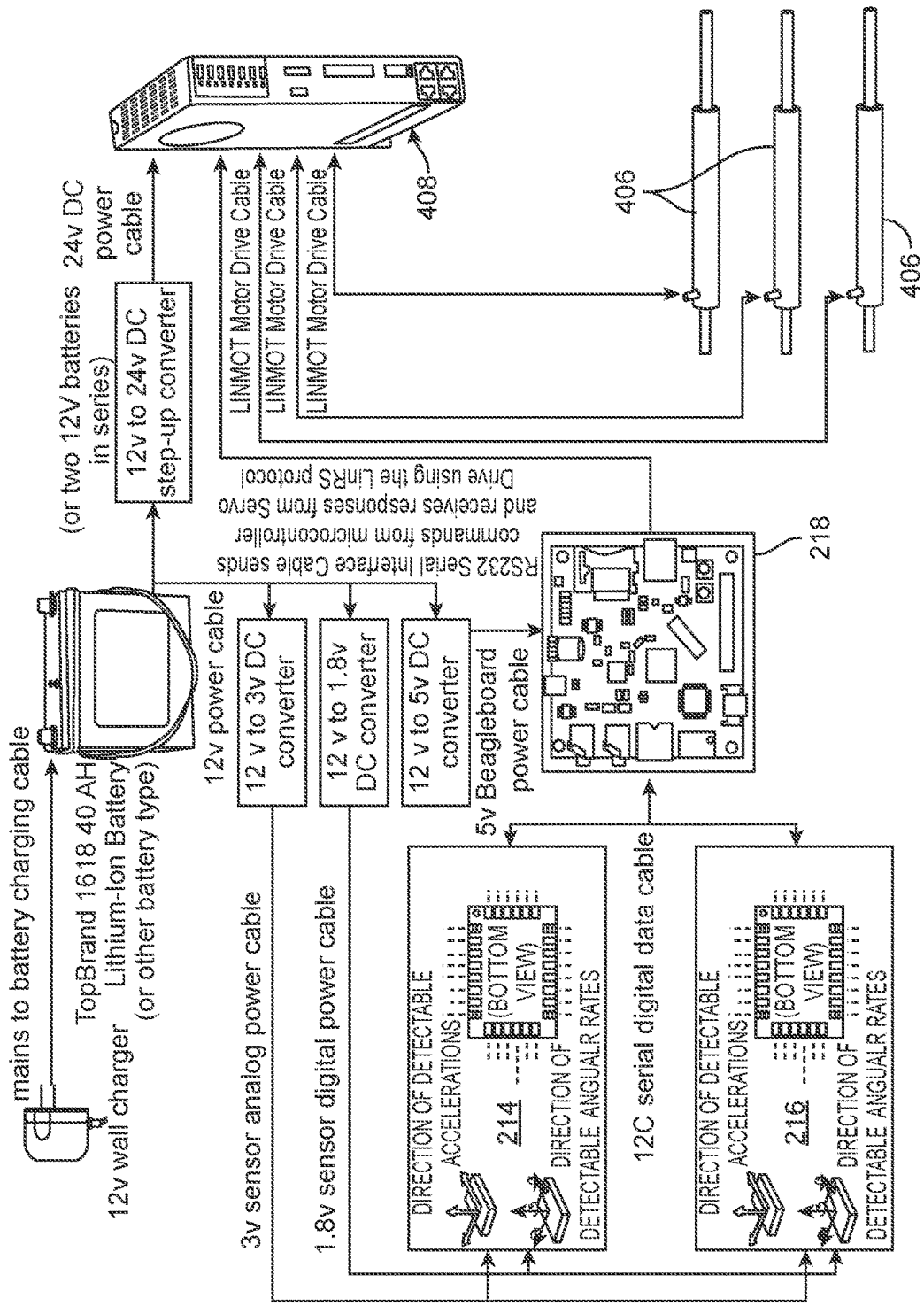
Figure 8D:
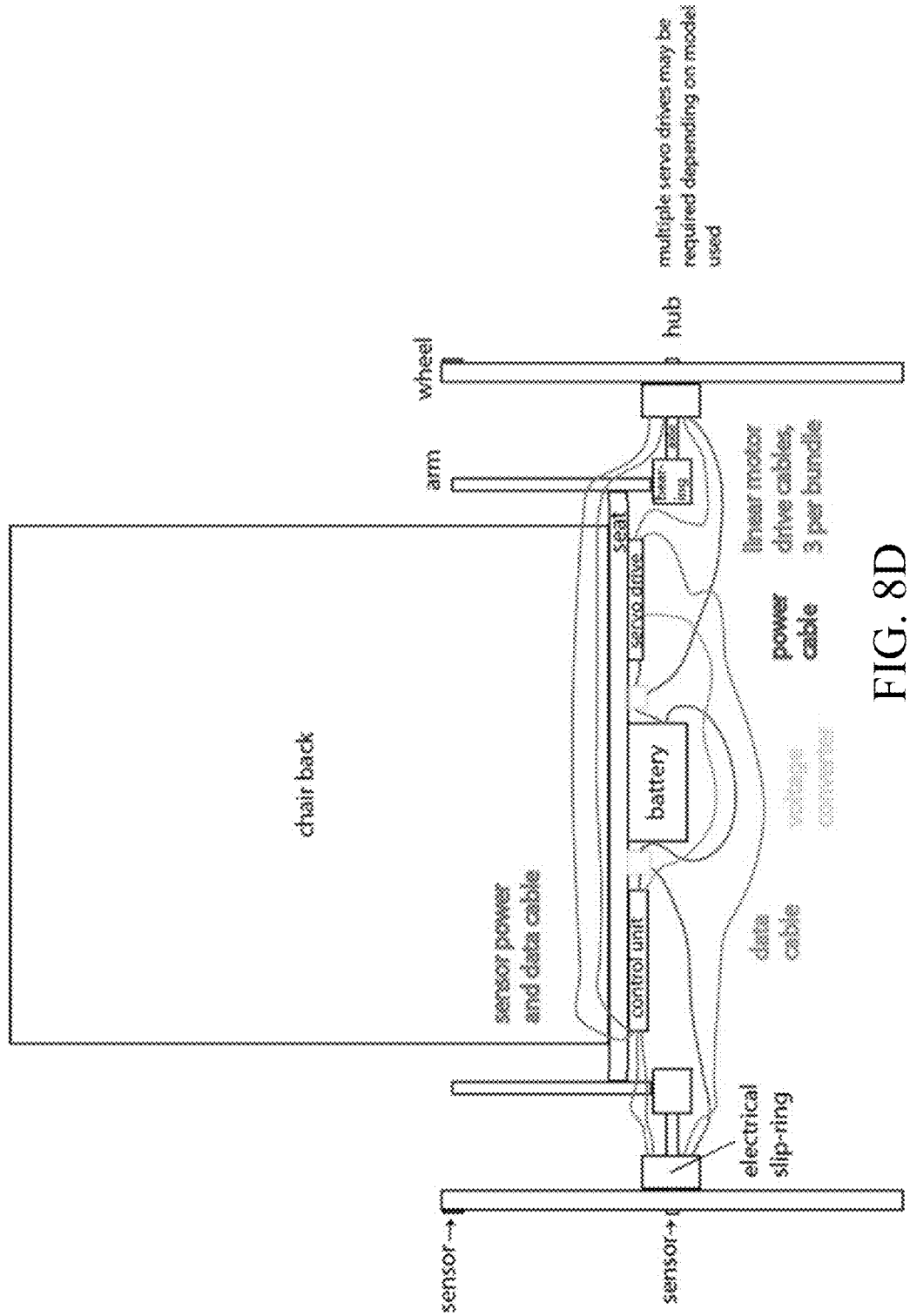

As illustrated, FIG. 8A shows an embodiment of a wheel using well known and conventional electrically powered spokes analogous to FIG. 1A. FIG. 8B shows the same embodiment as FIG. 8A with a displaced hub analogous to FIG. 1B. FIG. 8C shows systems overview of the major components that use electrically powered spokes analogous to FIG. 2B, and FIG. 8D is analogous to FIG. 2C. FIG. 8C shown an electronic control circuitry for linear motor embodiment (electrical connections made to component on wheel through electrical slipring on hub. Also shown are three LINMOT P01-37X120F-HP linear motors 406 (on wheel) function as rapidly and accurately adjustable high power spokes. Additionally shown are LINMOT servo Drive E1100-HC 408 powers, controls and monitors motors according to commands from the microcontroller. The combined rotary union and slip ring for this embodiment may be replaced by just a slip ring, and the connections to the spokes are now data and power cables rather than high pressure medium delivery tubing (for delivery of gas or fluid). As with the above embodiments, this non-limiting, exemplary embodiment may also be implemented as drive free axle or with a drive axle. Because this design does not need a reservoir tank or pump it is lighter and quieter than the pneumatic/hydraulic versions.

Figure 9C:
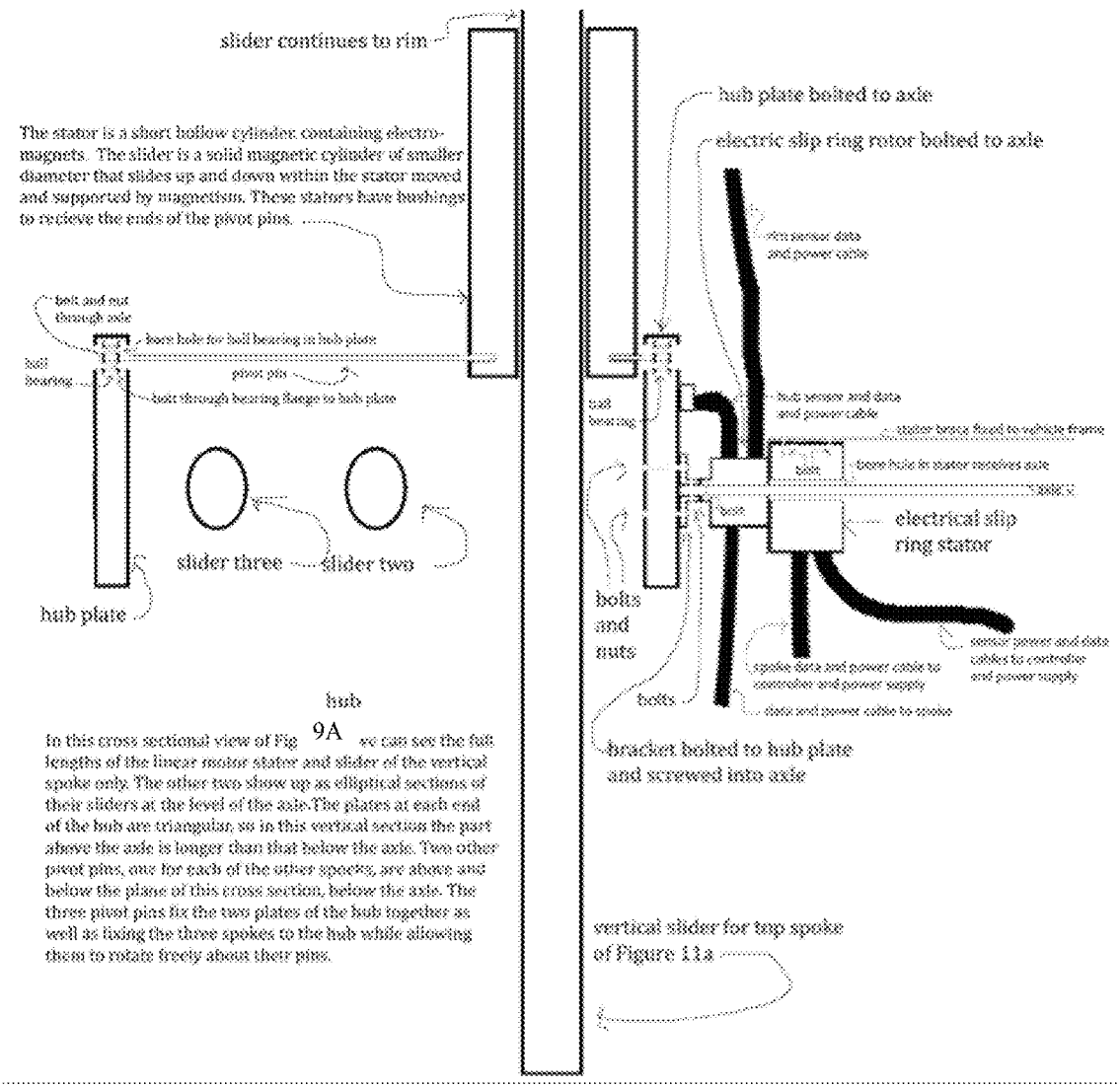

FIGS. 9A to 9C are non-limiting, exemplary illustrations of a wheel using single-staged linear electric motor with a "radial hub" configuration in accordance with one or more embodiments of the present invention. The wheel and intelligent suspension system illustrated in FIGS. 9A to 9C includes similar corresponding or equivalent components, interconnections, functional, operational, and or cooperative relationships as the wheel and intelligent suspension systems that are shown in FIGS. 1A to 8D, and described above. Therefore, for the sake of brevity, clarity, convenience, and to avoid duplication, the general description of FIGS. 9A to 9C will not repeat every corresponding or equivalent component, interconnections, functional, operational, and or cooperative relationships that has already been described above in relation to wheel and intelligent suspension systems that are shown in FIGS. 1A to 8D.

Single-staged linear electric motors are well known and conventional, and are fast, precise, quiet and light but have a fixed length. The hubs used (detailed below) must be wide so the wheels will also have to be wide. The radial hub is simple and allows for longer spokes since they run along wheel radii rather than wheel cords. With electric spokes, no pump, reservoir, and fluid or gas tubing is needed and no rotating union is needed, only the electrical slip ring.

An advantage of linear electric motors is that they often come with built in control circuitry that will allows them to accept commands to adjust to a given length at a given speed. This removes the need for a separate control module. The MCU can transmit commands directly to the spoke. In other well known models the control circuitry comes in a small separate module that would be mounted on the chair.

As illustrated in FIGS. 9A to 9C, the base of the stator is fixed to the hub bracket in exactly the same way as the spoke in FIGS. 1A and 1B. The end of the slider is fixed to the rim bracket in the same way as the base end of the pneumatic spoke in FIGS. 1A and 1B. Although the total length of the spoke, which is the length of the slider, does not change, as the slider is moved into the stator the distance between the base of the stator and the end of the slider decreases. The other end of the slider extends past the hub toward the opposite rim. In this way the effective length of the spoke can change from approximately the length of the slider when fully extended to the length of the stator when fully shortened. This allows for close to a 50% decrease in spoke length from maximum to minimum length.

The hub for this embodiment needs to allow the slider to move through the hub center as the spoke is contracted. In FIGS. 9A to 9C, the three sliders are projecting through the center of the hub. The three spokes do not intersect each other because they are displaced in the direction perpendicular to the plane of the drawing. In the cross section of FIG. 9B, the hub shows up as two separate plates, rectangles outlined in black labeled "hub". These plates are joined by a solid black line labeled pivot. The pivot has two parts extending from the end of the stator and mounted in the hub by two bearing modules to allow free rotation around the pivot.

The wide cylinder at the top of FIG. 9C is the stator, and from it is hanging down the narrow cylinder of the slider. As the spoke gets shorter, the slider extends further down in this diagram. As it gets longer, the slider moves up in this diagram. For simplicity FIG. 9C only shows the parts of one spoke. Because there are three pokes offset by 120 degrees the two plates of the hub are held together and fixed relative to each other by three pivots.

The left portion of the pivot between the left hub plate and the stator is very long because two more spokes have to fit in that space. The pivots are offset by 120 degrees from each other around the perimeter of the hub. This allows each spoke to rotate on its pivot about plus or minus 60 degrees without colliding with one of the other two pivots. The spokes never collide because they are offset in space between the two plates. This means the hub and rim of this version of the invention have to be extra wide.

Figure 10A:
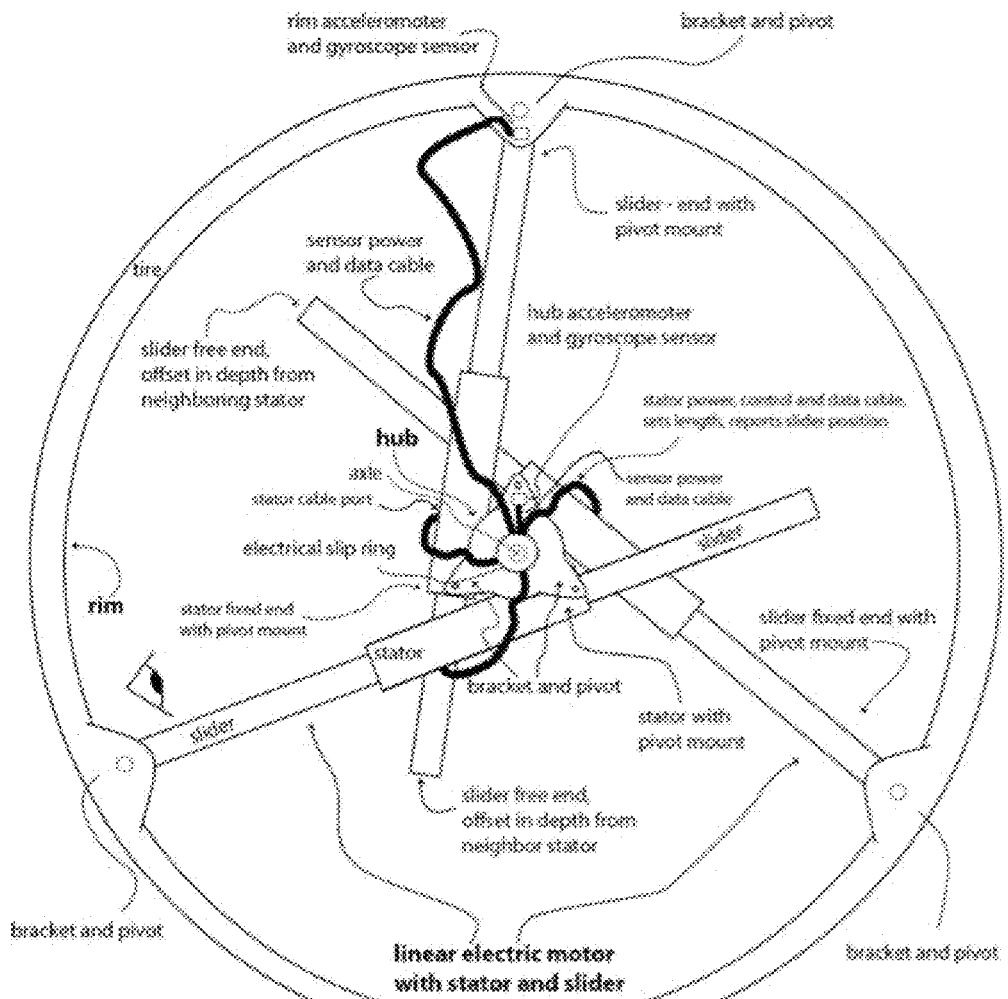
FIGS. 10A and 10B are non-limiting, exemplary illustrations of a wheel using single-staged linear electric motor with a "tangential hub" configuration in accordance with one or more embodiments of the present invention.
Figure 10B:
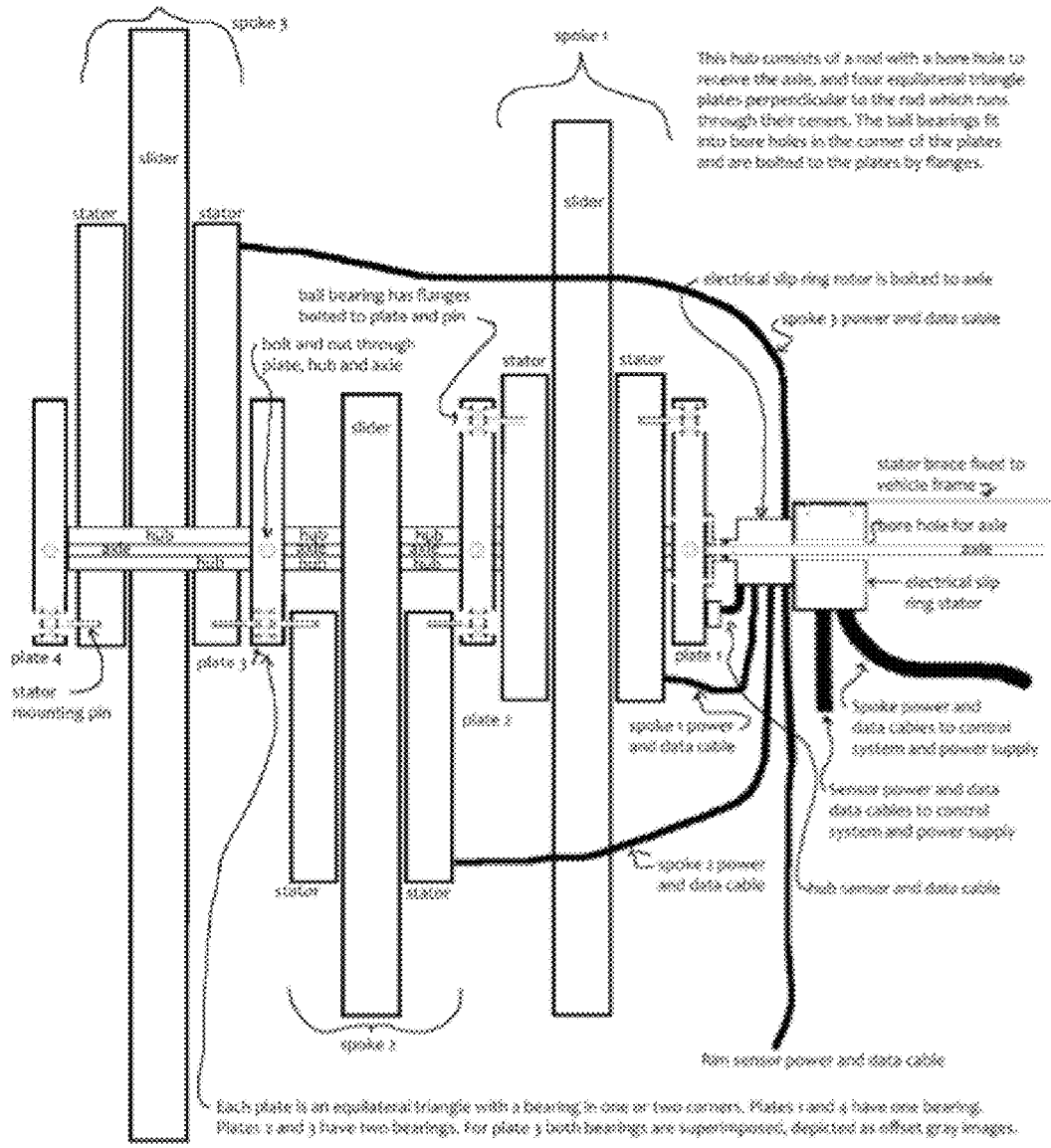

FIGS. 10A and 10B are non-limiting, exemplary illustrations of a wheel using single-staged linear electric motor with a "tangential hub" configuration in accordance with one or more embodiments of the present invention. The wheel and intelligent suspension system illustrated in FIGS. 10A and 10B includes similar corresponding or equivalent components, interconnections, functional, operational, and or cooperative relationships as the wheel and intelligent suspension systems that are shown in FIGS. 1A to 9C, and described above. Therefore, for the sake of brevity, clarity, convenience, and to avoid duplication, the general description of FIGS. 10A and 10B will not repeat every corresponding or equivalent component, interconnections, functional, operational, and or cooperative relationships that has already been described above in relation to wheel and intelligent suspension systems that are shown in FIGS. 1A to 9C.

The tangential hub configurations of FIGS. 10A and 10B has the advantages that it allows greater freedom of movement, and the hub is much stronger since it is not hollow. This is important because the hub is subject to strong unbalanced forces. In this non-limiting, exemplary embodiment, rather than running radially through the hub center the spokes run tangentially to the hub circumference. This allows the hub to be one slid piece. The upside to this design is a stronger hub. The downside is a more limited range of motion for the hub within the plane of the wheel.

FIGS. 10A and 10B show the hub located in the center position. The three spokes do not intersect each other because they are displaced in the direction perpendicular to the plane of the drawing. The three sliders are displaced in the direction perpendicular to the plane of the drawing so they do not collide as they rotate around the hub bracket pivot mount pivot. The end of the stator is fixed to the hub at the bracket by the pivot so that it can rotate freely. The slider moves back and forth inside the stator effectively adjusting the distance between the rim at the attachment point of the slider and the hub at the attachment point of the stator. As the spoke contracts in length the stator protrudes further toward the rim opposite the slider rim attachment. The eye on the right in FIG. 10A shows the direction of view of FIG. 10B. It should be noted that a strict cross sectional view would not show the sliders and stators of the spokes since they are not in the plane of the cross section, but they are shown for clarity.

FIGS. 10A and 10B show the hub as a solid cylindrical center with four flat circular plates spaced evenly across it and aligned perpendicularly to the longitudinal axis. The pivot for one slider runs between the left two plates, for the middle slider it runs as shown between the two middle plates, and for the third slider it runs between the right two plates. Only the central spoke and its pivot mount are shown in FIG. 13b as projected into the plane of the cross section of the hub.

The degree of freedom of rotation of the spoke around is limited by the other two pivots. If the If the spoke shown were to rotate too far in one direction around its pivot the stator would strike the central hub cylinder. If it rotates too far in the other direction the slider will strike the central hub cylinder.

In FIGS. 10A and 10B, the thick black lines labeled "Sensor power and data cable" connect each stator to the electrical slip ring and from there to the controlling computer. They transmit power to the spokes, send signals to control their movement to the spokes, and send data from the spokes about their current length to the controlling computer.

In FIGS. 10A and 10B the hub accelerometer and gyroscopesensor, which is the same component used in the first version of the invention above, is shown mounted on the same side of the hub as the combined fluid union and electrical slip ring assembly. The bearing that holds the wheel chair axle is located inside the central hub cylinder. The combined fluid union and electrical slip ring assembly is shown attached to the hub on the inner side of the hub, concentric to the axle.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. For example, all data signal transmissions (e.g., to or from MCU, sensors, etc.) may be made wirelessly using well known wireless technologies such as Near Field Communications, Bluetooth, etc. Another example is that the function of the electrical slip ring can be achieved with a non-contact inductive radial coupler. As another example magnetic bearings or fluid bearings may be used in place of ball bearings. The wheel may be a train or rail wheel or a part of a tank tread instead of a wheel with a tire. The vehicle can be a monocycle, a bicycle, or have many wheels. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A wheel, comprising:
a hub;
a rim; and
a set of spokes that have spoke lengths that are dynamically adjustable;
wherein: the hub is associated with the rim by the set of spokes that adjust spoke lengths to change hub position, orientation, and linear and angular accelerations within the rim using a microcontroller;
the rim includes one or more rim couplers that define one or more first pivot points for a first end of the spokes
the first end of the spokes is comprised of a bushing from which extends a threaded pin
the rim couplers include rim-support that is secured to an inner circumference of the rim;
the rim-support is comprised of lateral vertical supports that protrude from a connection base, and include a transversely extending bore;
the connection base of the rim support secures the rim support onto the inner circumference of the rim via a set of fasteners;
lateral vertical supports receive the threaded pin;
lateral vertical supports include an annular ball bearing housing that house ball bearing that receives the threaded pin and include a set of ball bearing flanges for securing the threaded pin to the ball bearing housing by fasteners.

2. The wheel as set forth in claim 1, wherein:
the rim is associated with the hub by at least three spokes.

3. The wheel as set forth in claim 1, wherein:
relative locations of the hub and the rim with respect to one another are varied as spoke lengths change.

4. The wheel as set forth in claim 1, wherein:
an axle of the wheel passes into the hub.

5. The wheel as set forth in claim 1, wherein:
a first distance between first end of spoke at the attachment point and inner circumference of rim is fixed and further, location of the first end of spoke along the lateral periphery of the rim is fixed, but an angle Ω formed between a longitudinal axis of the spoke and a tangent line to the rim, in the plane of the wheel at the point of attachment, is variable.

6. The wheel as set forth in claim 1, wherein:
spokes share a common plane within a plane of the rim.

7. The wheel as set forth in claim 1, wherein:
the hub of the wheel is maintained at a generally constant location by continuously varying spoke lengths while the wheel rotates.

8. The wheel as set forth in claim 1, wherein:
the set of spokes are comprised of pneumatic spokes that are comprised of pneumatic cylinders that are moved via pressurized gas delivered through gas delivery tubes from a pressurized gas tank using air pump to move cylinders and hence, adjust spoke lengths.

9. The wheel as set forth in claim 1, wherein:
the set of spokes are comprised of hydraulic spokes that are comprised of hydraulic cylinders that are moved by liquid delivered through liquid delivery tubes from a liquid tank using liquid pump to move cylinders and hence, adjust spoke lengths.

10. The wheel as set forth in claim 1, wherein:
Variable length spokes are located in the plane of the rim; fixed length spokes are located within their respective planes parallel to and offset from the plane of the rim.

11. The wheel as set forth in claim 1, wherein:
the set of spokes are comprised of linear electric motor spokes that are comprised of sliders containing electromagnets that are moved through stators containing magnets by means of varying electric currents and hence, adjust spoke lengths.

12. A method for control of suspension system of a wheel, comprising:
   maintaining location of a hub of a wheel relative to a rim of the wheel at a desired fixed offset location ($\Delta h_x$, $\Delta h_y$) relative to center of rim ($c_x$, $c_y$);
   receiving rim sensor location ($RS_x$, $RS_y$) and rim angular rotation $\theta$ from a rim sensor;
   determining center of rim ($c_x$, $c_y$) location in accordance with:

$c_x = RS_x - (R + \Delta R)\cos(\theta)$ $c_y = RS_y - (R + \Delta R)\sin(\theta)$ receiving hub sensor location ($HS_x$, $HS_y$) and hub angular rotation $\gamma$ from a hub sensor;
   determining hub center ($h_x$, $h_y$) location in accordance with:

$h_x = HS_x - (r + \Delta r)\cos(\gamma)$ $h_y = HS_y - (r + \Delta r)\sin(\gamma)$ determine approximate predicted updated values after $\Delta t$ for constant acceleration in accordance with:

$\theta \leftarrow \theta + \theta'\Delta t + \tfrac{1}{2}\theta''\Delta t^2$ $c_x \leftarrow c_x + c_x'\Delta t + \tfrac{1}{2}c_x''\Delta t^2$ $c_y \leftarrow c_y + c_y'\Delta t + \tfrac{1}{2}c_y''\Delta t^2$ $\theta' \leftarrow \theta' + \theta''\Delta t$ $c_x' \leftarrow c_x' + c_x''\Delta t$ $c_y' \leftarrow c_y' + c_y''\Delta t''$ determining needed spoke lengths S1, S2, and S3 to determine hub displacement in accordance with:

$A1 = (R\cos(\ominus), R\sin(\ominus))$ $A2 = (R\cos(\ominus+120), R\sin(\ominus+120))$ $A3 = (R\cos(\ominus+240), R\sin(\ominus+240))$ $B1 = (r\cos(\alpha+\ominus), r\sin(\alpha+\ominus)) + (\Delta h_x + c_x, \Delta h_y + c_y)$ $B2 = (r\cos(\alpha+\ominus+120), r\sin(\alpha+\ominus+120)) + (\Delta h_x + c_x, \Delta h_y + c_y)$ $B3 = (r\cos(\alpha+\ominus+240), r\sin(\alpha+\ominus+240)) + (\Delta h_x + c_x, \Delta h_y + c_y)$ $S1 = \|A1 - B1\|$ $S2 = \|A2 - B2\|$ $S3 = \|A3 - B3\|$ determining if S1, S2, and S3 are within range of possible values prior to transmitting change length command signal;
   if a spoke accept velocity control, transmit adjustment commands to spokes for spoke lengths S1, S2, and S3 by time $t_0 + \Delta t$;
   spoke lengths are changed according to instructions (length/time);
Wherein:
the coordinate system is a rectangular coordinate system, defining a Cartesian plane with an origin (0, 0) fixed relative to ground, outside of the wheel as wheel moves;
$c_x$ is the value of the abscissa of center of rim; $c_y$ is the value of the ordinate of the center of the rim;
notational symbol' after a variable represents a first derivative of that variable with respect to time, and the notational symbol" after a variable represents a second derivative of that variable with respect to time;
center of rim ($c_x$, $c_y$) is defined relative to the origin;
rim sensor location (RSx, RSy) is defined relative to the origin;
R is inner radius of the rim;
$\Delta R$ is defined as the difference between actual position of the rim sensor and R;
hub sensor location ($HS_x$, $HS_y$) is defined relative to the origin;
hub center ($h_x$, $h_y$) is defined relative to the origin;
r is outer radius of the hub;
$\Delta r$ is defined as the difference between actual position of the hub sensor and r;
$t_0$ is current time measured by microcontroller;
$\Delta t$ is constant time interval from reading of rim sensor data to completion of spoke length changes;
$\alpha$ is defined as 0 or 90 degrees depending on hub type, 0 for all cases except tangential hubs for which it is 90 degrees;
A1 is the location of the position of first end of the first spoke at rim;
A2 is the location of the position of first end of the second spoke at rim;
A3 is the location of the position of first end of the third spoke at rim;
B1 is the location of the position of second end of the first spoke at hub;
B2 is the location of the position of second end of the second spoke at hub; and
B3 is the location of the position of second end of the third spoke at hub.

13. A method for control of suspension system of a wheel, comprising:
   maintaining location of a hub of a wheel relative to a rim of the wheel at a desired fixed offset location ($\Delta h_x$, $\Delta h_y$) relative to center of rim ($c_x$, $c_y$);
   receiving rim sensor location ($RS_x$, $RS_y$) and rim angular rotation $\theta$ from a rim sensor;
   determining center of rim ($c_x$, $c_y$) location in accordance with:

$c_x = RS_x - (R + \Delta R)\cos(\theta)$ $c_y = RS_y - (R + \Delta R)\sin(\theta)$ receiving hub sensor location ($HS_x$, $HS_y$) and hub angular rotation $\gamma$ from a hub sensor;
   determining hub center ($h_x$, $h_y$) location in accordance with:

$h_x = HS_x - (r + \Delta r)\cos(\gamma)$ $h_y = HS_y - (r + \Delta r)\sin(\gamma)$ determine approximate predicted updated values after $\Delta t$ for constant acceleration in accordance with:

$\theta \leftarrow \theta + \theta'\Delta t + \tfrac{1}{2}\theta''\Delta t^2$ $c_x \leftarrow c_x + c_x'\Delta t + \tfrac{1}{2}c_x''\Delta t^2$ $c_y \leftarrow c_y + c_y'\Delta t + \tfrac{1}{2}c_y''\Delta t^2$ $\theta' \leftarrow \theta' + \theta''\Delta t$ $c_x' \leftarrow c_x' + c_x''\Delta t$ $c_y' \leftarrow c_y' + c_y''\Delta t''$ $\gamma \leftarrow \gamma + \gamma'\Delta t + \tfrac{1}{2}\gamma''\Delta t^2$ determining needed spoke lengths S1, S2, and S3 to determine hub displacement in accordance with:

$$A1=(R\cos(\Theta), R\sin(\Theta))$$

$$A2=(R\cos(\Theta+120), R\sin(\Theta+120))$$

$$A3=(R\cos(\Theta+240), R\sin(\Theta+240))$$

$$B1=(r\cos(\gamma), r\sin(\gamma))+(\Delta h_x+c_x, \Delta h_y+c_y)$$

$$B2=(r\cos(\gamma+120), r\sin(\gamma+120))+(\Delta h_x+c_x, \Delta h_y+c_y)$$

$$B3=(r\cos(\gamma+240), r\sin(\gamma+240))+(\Delta h_x+c_x, \Delta h_y+c_y)$$

$$S1=\|A1-B1\|$$

$$S2=\|A2-B2\|$$

$$S3=\|A3-B3\|$$

determining if S1, S2, and S3 are within range of possible values prior to transmitting change length command signal;
if a spoke accept velocity control, transmit adjustment commands to spokes for spoke lengths S1, S2, and S3 by time $t_0+\Delta t$;
if the spokes do not accept velocity control, estimate time $\delta t$ required for each spoke to reach the desired length, and transmit instructions at time $t_0+\Delta t-\delta t$;
spoke lengths are changed according to instructions (length/time);
Wherein:
the coordinate system is a rectangular coordinate system, defining a Cartesian plane with an origin (0, 0) fixed relative to ground, outside of the wheel as wheel moves;
center of rim ($c_x$, $c_y$) is defined relative to the origin;
$c_x$ is the value of the abscissa of center of rim in relation to origin; $c_y$ is the value of the ordinate of the center of the rim in relation to origin;
notational symbol' after a variable represents a first derivative of that variable with respect to time, and the notational symbol" after a variable represents a second derivative of that variable with respect to time;
rim sensor location (RSx, RSy) is defined relative to the origin;
R is inner radius of the rim;
$\Delta R$ is defined as the difference between actual position of the rim sensor and R;
hub sensor location ($HS_x$, $HS_y$) is defined relative to the origin;
hub center ($h_x$, $h_y$) is defined relative to the origin;
r is outer radius of the hub;
$\Delta r$ is defined as the difference between actual position of the hub sensor and r
$t_0$ is current time measured by microcontroller;
$\Delta t$ is constant time interval from reading of rim sensor data to completion of spoke length changes;
$\alpha$ is defined as 0 or 90 degrees depending on hub type, 0 for all cases except tangential hubs, 0 for all cases except tangential hubs;
A1 is the location of the position of first end of the first spoke at rim;
A2 is the location of the position of first end of the second spoke at rim;
A3 is the location of the position of first end of the third spoke at rim;
B1 is the location of the position of second end of the first spoke at hub;
B2 is the location of the position of second end of the second spoke at hub;
B3 is the location of the position of second end of the third spoke at hub.

14. A method for control of suspension system of a wheel, comprising:
maintaining location of a hub of a wheel relative to a rim of the wheel at a desired fixed offset location ($\Delta h_x$, $\Delta h_y$) relative to center of rim ($c_x$, $c_y$);
receiving rim sensor location ($RS_x$, $RS_y$) and rim angular rotation $\theta$ from a rim sensor;
determining center of rim ($c_x$, $c_y$) location in accordance with:

$$c_x=RS_x-(R+\Delta R)\cos(\theta)$$

$$c_y=RS_y-(R+\Delta R)\sin(\theta)$$

receiving hub sensor location ($HS_x$, $HS_y$) and hub angular rotation $\gamma$ from a hub sensor;
determining hub center ($h_x$, $h_y$) location in accordance with:

$$h_x=HS_x-(r+\Delta r)\cos(\gamma)$$

$$h_y=HS_y-(r+\Delta r)\sin(\gamma)$$

determining current spoke lengths $S1_0$, $S2_0$, and $S3_0$ and current hub angular rotation $\gamma$ in accordance with:

$$A1=(R\cos(\Theta), R\sin(\Theta))$$

$$A2=(R\cos(\Theta+120), R\sin(\Theta+120))$$

$$A3=(R\cos(\Theta+240), R\sin(\Theta+240))$$

$$B1=(r\cos(\gamma), r\sin(\gamma))+(h_x, h_y)$$

$$B2=(r\cos(\gamma+120), r\sin(\gamma+120))+(h_x, h_y)$$

$$B3=(r\cos(\gamma+240), r\sin(\gamma+240))+(h_x, h_y)$$

$$S1_0=\|A1-B1\|$$

$$S2_0=\|A2-B2\|$$

$$S3_0=\|A3-B3\|$$

$$\gamma_0=\gamma$$

determine approximate predicted updated values after $\Delta t$ for constant acceleration in accordance with:

$$\theta \leftarrow \theta+\theta'\Delta t+\tfrac{1}{2}\theta''\Delta t^2$$

$$c_x \leftarrow c_x+c_x'\Delta t+\tfrac{1}{2}c_x''\Delta t^2$$

$$c_y \leftarrow c_y+c_y'\Delta t+\tfrac{1}{2}c_y''\Delta t^2$$

$$\theta' \leftarrow \theta'+\theta''\Delta t$$

$$c_x' \leftarrow c_x'+c_x''\Delta t$$

$$c_y' \leftarrow c_y'+c_y''\Delta t''$$

determining optimal $\gamma$ for minimal spoke length changes, that is the $\gamma$ that minimizes the largest of the following three quantities:

$$|S1-S1_0|,$$

$$|S2-S2_0|, \text{ and}$$

$$|S3-S3_0|.$$

15. A wheel, comprising:
a hub;
a rim; and
a set of spokes that have spoke lengths that are dynamically adjustable;
wherein: the hub is associated with the rim by the set of spokes that adjust spoke lengths to change hub position, orientation, and linear and angular accelerations within the rim using a microcontroller;
a hub profile of the hub has a triangular configuration, with spokes associated with vertices;
the hub includes hub couplers that define one or more second pivot points for a second end of the spokes;
the hub includes hub opening at the hub center, defining bore for receiving the wheel axle;
a rotating union and electrical slip ring assembly is coupled with the hub profile, with the rotating union and electrical slip ring assembly comprised of:
a through-opening for receiving wheel axle;
an integrated rotary union and electric slip ring stator that is secured to the wheel axle by a first fastener; and
an integrated rotary union and electric slip ring rotor that is secured to the hub by a second fastener.

16. The wheel as set forth in claim 15, wherein:
the hub couplers include hub-supports that extend vertically from the hub;
the hub-supports are lateral vertical flanges that protrude from main hub body, and include a transversally extending bore;
the hub-supports receive a pivot pin;
the hub-supports include a bearing housing with bearings that receive the pivot pin, and include a set of bearing flanges for securing the pivot pin to the bearing housing by fasteners.

17. The wheel as set forth in claim 16, wherein:
a rotating union and electrical slip ring assembly is coupled with the hub profile.

18. The wheel as set forth in claim 17, wherein:
the rotating union and electrical slip ring assembly is coupled with:
cables for transmission data and power between spoke and microcontroller;
a second set of cables for transmission of hub data and power between hub and microcontroller;
a third set of cables for transmission of rim data and power between rim and the microcontroller; and
set of tubes for delivery of pressurized gas or liquid to expand or contract spokes.

19. The wheel as set forth in claim 18, wherein:
the hub includes a central bore for receiving axle;
the hub includes ball bearings housed within an annular housing that enable the hub to freely rotate around the wheel axle;
the ball bearings are secured within lubricant chamber;
the annular housing includes a set of flanges that enable the annular housing to be fastened onto the axle by a set of fasteners.

20. The wheel as set forth in claim 18, wherein:
the hub includes a central bore for receiving axle;
the bore includes flanges that enable hub to be secured to axle via a set of fasteners.

21. The wheel as set forth in claim 15, wherein:
one or more sensors are associated with the hub, the rim, and the set of spokes; and
the microcontroller unit (MCU) receives sensory signals from the one or more sensors, and transmits control signals to a driver to actuate the set of spokes to dynamically control spoke lengths of the set of spokes.

22. A wheel, comprising:
a hub;
a rim; and
a set of spokes that have spoke lengths that are dynamically adjustable;
wherein: the hub is associated with the rim by the set of spokes that adjust spoke lengths to change hub position, orientation, and linear and angular accelerations within the rim using a microcontroller;
a hub profile of the hub has a triangular configuration, with spokes associated with vertices;
the hub includes hub couplers that define one or more second pivot points for a second end of the spokes;
the hub includes hub opening at the hub center, defining bore for receiving the wheel axle;
a rotating union and electrical slip ring assembly is coupled with the hub profile, with the rotating union and electrical slip ring assembly comprised of:
a through-opening for receiving wheel axle;
an integrated rotary union and electric slip ring stator that is secured to a stator brace, which is fixed to vehicle frame by a first fastener; and
an integrated rotary union and electric slip ring rotor that is secured to the hub by the axle by one or more fastener.

* * * * *